(12) United States Patent
Slack et al.

(10) Patent No.: US 11,788,363 B2
(45) Date of Patent: Oct. 17, 2023

(54) TOOL JOINT CLAMP

(71) Applicant: NOETIC TECHNOLOGIES INC., Edmonton (CA)

(72) Inventors: Maurice William Slack, Edmonton (CA); Victor Yung, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 17/800,181

(22) PCT Filed: Apr. 5, 2021

(86) PCT No.: PCT/CA2021/000029
§ 371 (c)(1),
(2) Date: Aug. 16, 2022

(87) PCT Pub. No.: WO2021/195742
PCT Pub. Date: Oct. 7, 2021

(65) Prior Publication Data
US 2023/0074786 A1 Mar. 9, 2023

Related U.S. Application Data

(60) Provisional application No. 63/049,625, filed on Jul. 8, 2020, provisional application No. 63/003,969, filed on Apr. 2, 2020.

(51) Int. Cl.
*F16L 21/06* (2006.01)
*E21B 17/04* (2006.01)
*F16L 25/14* (2006.01)

(52) U.S. Cl.
CPC ............ *E21B 17/04* (2013.01); *F16L 21/065* (2013.01); *F16L 25/14* (2013.01)

(58) Field of Classification Search
CPC .......... E21B 17/04; F16L 21/065; F16L 25/14; F16L 21/06
See application file for complete search history.

(56) References Cited

U.S. PATENT DOCUMENTS

| 1,054,812 A | 3/1913 | Zierath |
| 3,769,665 A | 11/1973 | Mckown, Jr. |

(Continued)

FOREIGN PATENT DOCUMENTS

| AU | 2009201205 A1 | 10/2009 |
| CN | 201526281 U | 7/2010 |

(Continued)

OTHER PUBLICATIONS

International Search Report re PCT/CA2021/000029, completed by the ISA/CA on Jun. 22, 2021, and issued by the ISA/CA dated Jun. 29, 2021.

(Continued)

*Primary Examiner* — Taras P Bemko
(74) *Attorney, Agent, or Firm* — Donald V. Tomkins

(57) ABSTRACT

A clamp assembly, for mounting around a tool joint coaxially joining cylindrical upper and lower workpieces, comprises an upper collar assembly and a lower collar assembly, each having semi-cylindrical left and right collar segments. The left and right collar segments of each collar assembly are removably connectable to each other by threaded fasteners to form the collar assembly. The upper and lower collar assemblies are coaxially mountable around the upper and lower workpieces, respectively, such that tightening the fasteners will urge the upper and lower collar assemblies to grip the upper and lower workpieces, respectively, and thus to provide increased resistance to relative rotation between the two workpieces about the tool joint axis. The upper and lower left collar segments, and/or the upper and lower right collar segments, may be interlockingly and radially slidable (Continued)

relative to each other to accommodate differences between the outside diameters of the two workpieces.

12 Claims, 21 Drawing Sheets

(56) References Cited

U.S. PATENT DOCUMENTS

| | | | |
|---|---|---|---|
| 3,866,954 A | 2/1975 | Slator et al. | |
| 3,954,288 A | 5/1976 | Smith | |
| 4,108,478 A | 8/1978 | Lynch | |
| 4,534,585 A | 8/1985 | Saliger | |
| 6,305,719 B1 | 10/2001 | Smith, Jr. et al. | |
| 6,929,287 B2 * | 8/2005 | Flindall | F16L 23/036 285/95 |
| 7,665,773 B2 | 2/2010 | Jones et al. | |
| 7,963,569 B2 | 6/2011 | Subbaraman et al. | |
| 9,309,729 B2 | 4/2016 | Sjursaether | |
| 9,366,096 B2 | 6/2016 | Bowley et al. | |
| 9,708,865 B2 | 7/2017 | Steen et al. | |
| 9,835,277 B2 | 12/2017 | Chiproot | |
| 10,190,707 B2 * | 1/2019 | Brandt | B21D 1/00 |
| 10,400,511 B2 | 9/2019 | Netecke et al. | |
| 10,731,776 B2 * | 8/2020 | Ciasulli | F16L 23/08 |
| 10,815,737 B1 | 10/2020 | Buck et al. | |
| 2008/0251651 A1 * | 10/2008 | Jackson | F16L 3/1016 248/62 |
| 2009/0080968 A1 * | 3/2009 | Parrett | B62K 19/36 403/290 |
| 2010/0007136 A1 | 1/2010 | Subbaraman et al. | |
| 2012/0125633 A1 * | 5/2012 | Linde | E21B 33/08 166/381 |
| 2012/0312552 A1 * | 12/2012 | Rayssiguier | E21B 17/023 166/380 |
| 2016/0362943 A1 | 12/2016 | Malstam et al. | |
| 2018/0135786 A1 | 5/2018 | Bourbon et al. | |
| 2018/0259110 A1 | 9/2018 | Mancier et al. | |
| 2019/0086006 A1 * | 3/2019 | Nam | F16L 17/06 |
| 2020/0048969 A1 * | 2/2020 | Aas | F16B 7/0413 |

FOREIGN PATENT DOCUMENTS

| | | |
|---|---|---|
| CN | 103742081 A | 4/2014 |
| CN | 102839923 B | 2/2015 |
| EP | 1568930 B1 | 9/2006 |
| EP | 2569567 B1 | 6/2014 |
| EP | 2907595 A1 | 8/2015 |
| WO | 2000066929 A1 | 11/2000 |
| WO | WO-2011141023 A2 * | 11/2011 ............. F16L 23/10 |

OTHER PUBLICATIONS

Written Opinion of the International Searching Authority re PCT/CA2021/100029, completed by the ISA/CA on Jun. 22, 2021, and issued by the ISA/CA dated Jun. 29, 2021.
Formal Response to Written Opinion of ISA/CA re PCT/CA2021/000029, filed at the IPEA/CA on Jan. 17, 2022.
International Preliminary Report on Patentability (Chapter II) re PCT/CA2021/000029, issued by the IPEA/CA dated Aug. 3, 2022.
https://www.foremost.ca/foremost-mobile-equipment/mining-drill-tooling/variable-range-tool-joint-clamp/—"Tool Joint Clamp" brochure.
http://tundrasales.com/product/tool-joint-clamp/—"Tool Joint Clamp" brochure.

* cited by examiner

TOOL JOINT CLAMP

FIELD

The present disclosure relates in general to tools or devices for creating or augmenting the torque capacity of connections between two adjoining elements or workpieces. In particular, the present disclosure relates to oilfield threaded connections, such as but not limited to tool joints used to connect tubular string segments and drilling tools.

BACKGROUND

Until fairly recently, the use of power tongs in coordination with drilling rig hoisting systems has been the most common method for installing tubular strings (e.g., drill strings and casing strings) in petroleum wells. This method allows such tubular strings, comprising pipe segments with mating threaded ends, to be assembled relatively efficiently using power tongs to screw the threaded ends of pipe segments together, forming threaded connections between sequential pipe segments as a tubular string is assembled and installed in a wellbore (i.e., "make-up" operations). Power tongs can also be used to unscrew threaded connections to disassemble a tubular string being pulled out of a wellbore (i.e., "break-out" operations). This method for installing and removing tubular strings requires two independent systems—namely, power tongs for make-up and break-out operations, and a drilling rig hoisting system for hoisting and lowering the tubular string.

Modern drilling rigs commonly utilize a top drive, which has a primary purpose of enabling the efficient drilling of petroleum wells. These drilling rigs also enable a new method for running casing into a wellbore using tools commonly known as casing running tools (or "CRTs"). CRTs are mounted to and suspended from the top drive quill, grip the upper end of a tubular casing segment, and provide a seal between the bore of the gripped casing segment and the bore of the top drive quill. In coordination with the top drive, CRTs support both make-up and break-out operations as well as both hoisting and lowering of the casing string, thereby eliminating the need to use power tongs for casing make-up and break-out operations.

Commonly, one or more additional components (such as saver subs, torque-turns measurement subs, and/or crossover subs) are installed between the top drive quill and the CRT. The top drive quill, CRT, and additional components are assembled using standardized drill pipe threaded connections (alternatively referred to as "tool joints") in which a male-threaded end (or "pin end") of one component is screwed into a female-threaded end (or "box end") of another component. If insufficient torque is applied to a tool joint during the make-up operation, then the tool joint may become unintentionally loosened during subsequent well construction operations and could result in injury to rig personnel or damage to equipment.

Numerous examples of devices and methods for securing threaded connections such as drill pipe tool joints may be found in the prior art, such as in:
   U.S. Pat. No. 1,054,812 (Zierath);
   U.S. Pat. No. 4,534,585 (Saliger);
   U.S. Pat. No. 7,963,569 (Subbaraman et al.);
   U.S. Pat. No. 9,708,865 (Steen et al.);
   U.S. Pat. No. 10,815,737 (Buck et al.);
   International Publication No. WO 2000/066929 (Grant Prideco, Inc.);
   Australian Patent Application No. 2009201205 (Haines et al.);
   U.S. Pat. No. 4,108,478 (Lynch);
   U.S. Pat. No. 9,366,096 (Bowley et al.);
   U.S. Pat. No. 10,400,511 (Netecke et al.);
   U.S. Pat. No. 3,866,954 (Slater et al.);
   U.S. Patent Pub. No. 2016/0362943 (Malstam et al.);
   CN Patent No. 102839923;
   CN Patent Pub. No. 103742081; and
   CN Patent No. 201526281.

The industry standard API Specification 7-2 "Threading and Gauging of Rotary Shouldered Connections", Second Edition, January 2017, controls certain geometric features of tool joints, such as thread profile and thread dimensions, to ensure adequate load transfer and fluid sealing of the threaded connection between two components ("workpieces"). This standard only loosely controls the outside diameter of the tool joint beyond the threads. Thus, after make-up of a tool joint connection, it is common to find that the outside diameters of the two joined tubular components differ significantly. For optimal effectiveness, therefore, it is preferable for devices and methods for securing and augmenting the torque transfer capacity of tool joints in tubular strings to be capable of accommodating differences between the outside diameters of the tubular components making up the tool joints.

BRIEF SUMMARY

In this patent document, certain components of disclosed embodiments are described using modifying terms including "upper", "lower", "upward", "downward", "left", "right", "horizontal", and "vertical". These terms are used to establish a convenient frame of reference to facilitate explanation and to enhance the reader's understanding of the spatial relationships and relative locations of the various elements and features of the components in question. The use of these terms herein is consistent with how the components are illustrated in the accompanying drawings (in which the longitudinal axis of all illustrated tool joints and tool joint clamp assemblies is vertical), but it is to be understood that they do not necessarily literally represent or correspond to the orientation or spatial relationships of the components as they would appear in operational implementations of the disclosed embodiments.

In general terms, the present disclosure teaches embodiments of a tool joint clamp assembly for mounting around a tool joint, which is to be understood for purposes of this disclosure as meaning a threaded connection coaxially joining two generally cylindrical workpieces, and having a longitudinal tool joint axis. The clamp assembly provides increased resistance to relative rotation between the two workpieces about the tool joint axis, while also accommodating differences between the outside diameters of the two workpieces.

In one exemplary embodiment in accordance with the present disclosure, the tool joint clamp assembly comprises a lower collar assembly and an upper collar assembly, wherein:
   (a) the lower collar assembly comprises a semi-cylindrical lower left collar segment and a semi-cylindrical lower right collar segment, wherein:
      the lower left and lower right collar segments are removably connectable to each other by threaded fasteners to form the lower collar assembly; and
      the lower collar assembly is coaxially mountable around the lower workpiece such that tightening the fasteners connecting the lower left and lower right collar segments will urge the lower collar assembly to grip the lower workpiece;

(b) the upper collar assembly comprises a semi-cylindrical upper left collar segment and a semi-cylindrical upper right collar segment, wherein:
the upper left and upper right collar segments are removably connectable to each other by threaded fasteners to form the upper collar assembly; and
the upper collar assembly is coaxially mountable around the upper workpiece such that tightening the fasteners connecting the upper left and upper right collar segments will urge the upper collar assembly to grip the upper workpiece;

(c) each of the lower left and lower right collar segments defines an upward-facing semi-annular surface;

(d) each of the upper left and upper right collar segments defines a downward-facing semi-annular surface; and (e) the upward-facing surface of the lower left collar segment and the downward-facing surface of the upper left collar segment are complementarily profiled to form an interlocking linear slide mechanism allowing relative horizontal sliding of the lower left and upper left collar segments while preventing relative rotation of the lower left and upper left collar segments about the clamp assembly axis, wherein the sliding direction of the linear slide mechanism is parallel to a vertical reference plane coincident with the clamp assembly axis and bisecting the interlocked lower left and upper left collar segments.

In some embodiments, the interlocking linear slide mechanism is a dovetail slide mechanism comprising slidably interlocking dovetail elements.

In some embodiments, tool joint clamp assemblies in accordance with the present disclosure may be configured such that:
the lower left and lower right collar segments are identical (meaning functionally interchangeable, in the context of the present disclosure) and are rotationally symmetric about the clamp assembly axis; and
the upper left and upper right collar segments are identical and are rotationally symmetric about the clamp assembly axis.

In other embodiments, tool joint clamp assemblies in accordance with the present disclosure may be configured such that:
the lower left and upper left collar segments are identical and are rotationally symmetric about a first transverse axis that lies in a horizontal reference plane generally defined by the upward-facing and downward facing semi-annular surfaces, respectively, of the interlocked lower left and upper left collar segments, is perpendicular to and intersects the clamp assembly axis, and is parallel to the sliding direction of the interlocking linear slide mechanism; and
the lower right and upper right collar segments are identical and are rotationally symmetric about the first transverse axis.

In other embodiments, tool joint clamp assemblies in accordance with the present disclosure may be configured such that:
the lower left collar segment and the upper right collar segment are identical and are rotationally symmetric about a second transverse axis that lies in the horizontal reference plane, is perpendicular to and intersects the clamp assembly axis, and is perpendicular to the sliding direction of the interlocking linear slide mechanism; and
the lower right collar segment and the upper left collar segment are identical and are rotationally symmetric about the second transverse axis.

In further embodiments, tool joint clamp assemblies in accordance with the present disclosure may be configured such that the collar segments are identical and are rotationally symmetric about the first transverse axis.

In some embodiments, tool joint clamp assemblies in accordance with the present disclosure may be configured such that the threaded fasteners may be loosely assembled with barrel nuts (also known as steel cross dowels or dowel nuts) and barrel washers to facilitate mounting of the clamp assembly onto the tool joint and to accommodate angular misalignment between two segments of a collar assembly. A first collar segment of each collar assembly is configured with holes that hold captive the loosely assembled threaded fasteners, barrel washers, and barrel nuts. The second collar segment of each collar assembly is configured with hooks that permit the loosely-assembled threaded fasteners, barrel washers, and barrel nuts to quickly latch the second segment, and securely retain the barrel nut while the threaded fasteners are tightened.

The inner surface of each collar segment that forms part of an interlocking linear slide mechanism may be provided with one or more grip elements each having a gripping surface configured for gripping engagement with a cylindrical outer surface of a workpiece of the threaded connection at one or more circumferential locations. The locations and configurations of the grip elements are preferably selected such that the longitudinal axis of any workpiece within the working size range of the corresponding collar assembly will, when gripped by the collar assembly, be coincident with the previously-mentioned vertical reference plane. This may be readily achieved by providing each collar segment with two grip elements equidistant from the vertical reference plane. However, other embodiments may provide fewer than or more than two grip elements on each collar segment without departing from the scope of the present disclosure.

The grip elements may be formed integrally with or permanently fixed to the inside surfaces of the collar segments, or alternatively may be provided in the form of removable grip elements such as well-known oilfield "tong dies". The size of the tong dies or other types of removable grip elements may be changed to alter the range of workpiece diameters that the collar assembly can grip.

The threaded fasteners are oriented parallel both to each other and to the sliding direction of the interlocking linear slide mechanism(s). Tightening the threaded fasteners increases the gripping force of a collar assembly onto a workpiece of the tool joint, and also causes each segment of the collar assembly to deform. The magnitude of deformation correlates with the magnitude of the gripping force.

Optionally, the segments of the collar assemblies may be provided with gauging surfaces for measurement of the deformation to determine the gripping force, and dimensional gauges may be used to determine whether the deformation, and thus gripping force, is within a desired range.

Clearance holes in the collar segments for the threaded fasteners may be selected to be close fitting with the threaded fasteners, and thus enabling the tool joint clamping assembly to more effectively resist relative rotation between the workpieces of the tool joint by transfer of shear force between the left and right collar segments of the collar assemblies via the threaded fasteners.

Supporting means may be used to facilitate assembly of a clamp assembly onto a tool joint, or disassembly therefrom, by supporting one or more collar segments in place next to the tool joint when the threaded fasteners are not tight during assembly or disassembly. The supporting means may be attached to each collar segment or may be a support device separate from the clamp assembly. One such supporting means is a support device comprising a support platform element and an attachment element. The support platform element provides a surface upon which the collar segments of may rest. The attachment element secures the support device to a workpiece of the tool joint, and may comprise a commonly available lifting magnet as known to persons skilled in the art.

BRIEF DESCRIPTION OF THE DRAWINGS

Embodiments in accordance with the present disclosure will now be described with reference to the accompanying Figures, in which numerical references denote like parts, and in which.

DETAILED DESCRIPTION

Embodiment #1, with Dovetail Slide Mechanism

Figure 1:
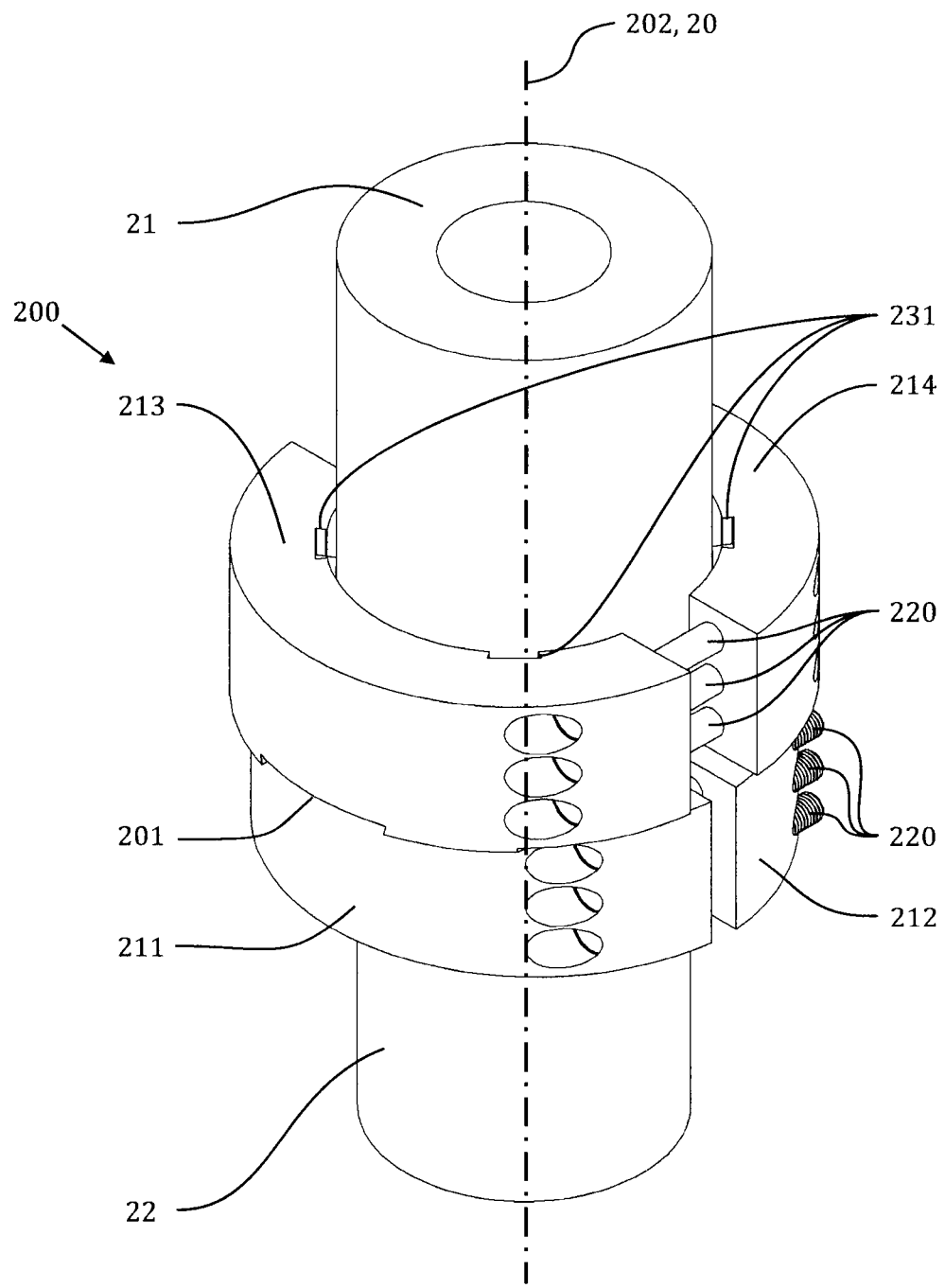
FIG. 1 is an isometric view of a first embodiment of a tool joint clamp assembly in accordance with the present disclosure, shown assembled around a tool joint.

FIG. 1 is an isometric view of a first embodiment 200 of a tool joint clamp assembly in accordance with the present disclosure, and comprising:
  a lower collar assembly comprising a lower left collar segment 211 and a lower right collar segment 212; and
  an upper collar assembly comprising an upper left collar segment 213 and an upper right collar segment 214.

Tool joint clamp assembly 200 has a longitudinal clamp assembly axis 202, and incorporates a first interlocking linear slide mechanism 201 provided between lower left collar segment 211 and upper left collar segment 213, as described in further detail below. Clamp assembly 200 is shown assembled around a tool joint having a longitudinal tool joint axis 20, and comprising a cylindrical upper workpiece 21 coaxially threaded to a cylindrical lower workpiece 22 such that the clamp assembly axis 202 is coincident with tool joint axis 20.

Figure 2:
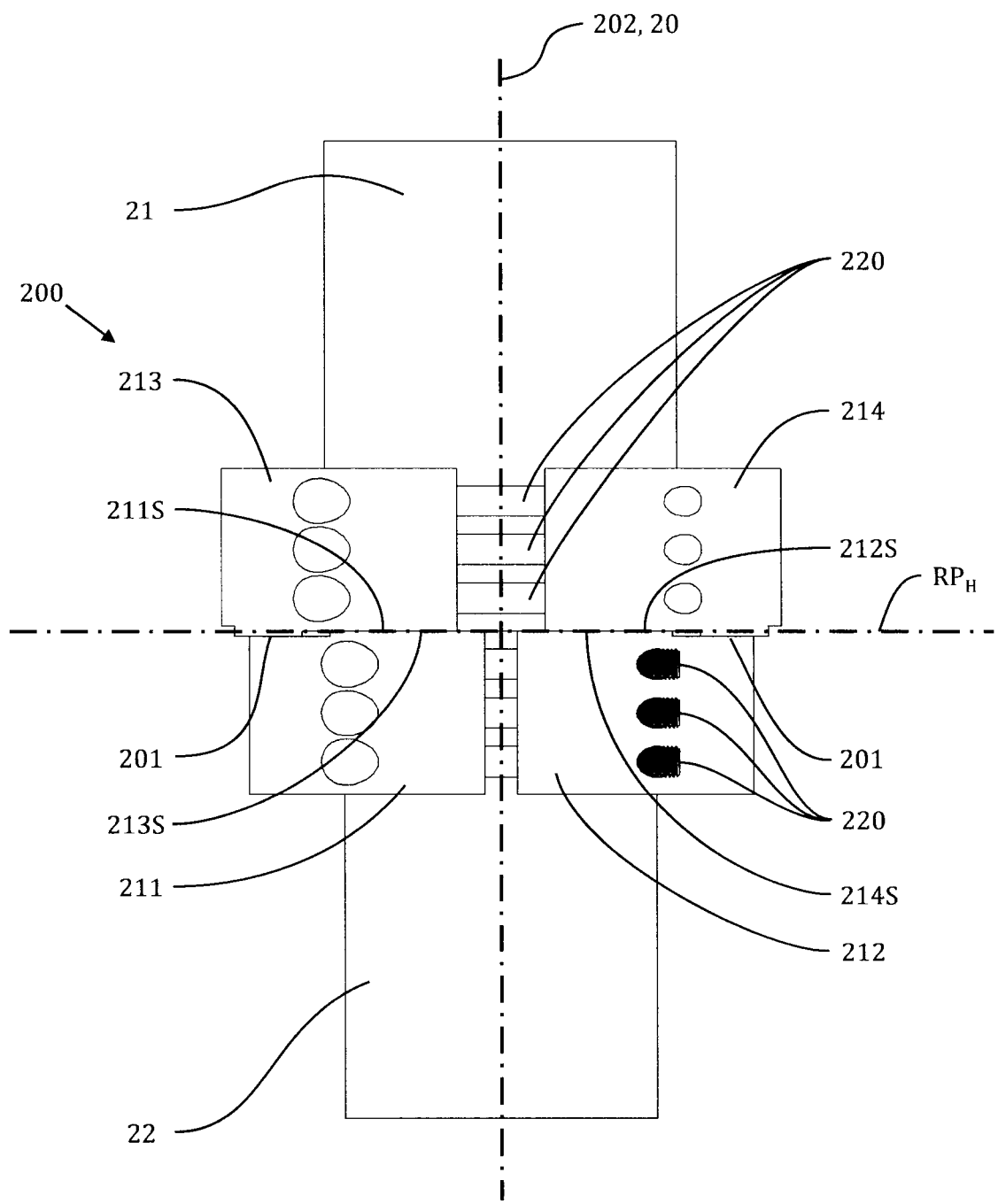
FIG. 2 is a front elevation of the clamp assembly in FIG. 1.

FIG. 2 is a front elevation of clamp assembly 200 showing the upper and lower collar assemblies adapted to workpieces 21 and 22 having different outside diameters.

Figure 3:
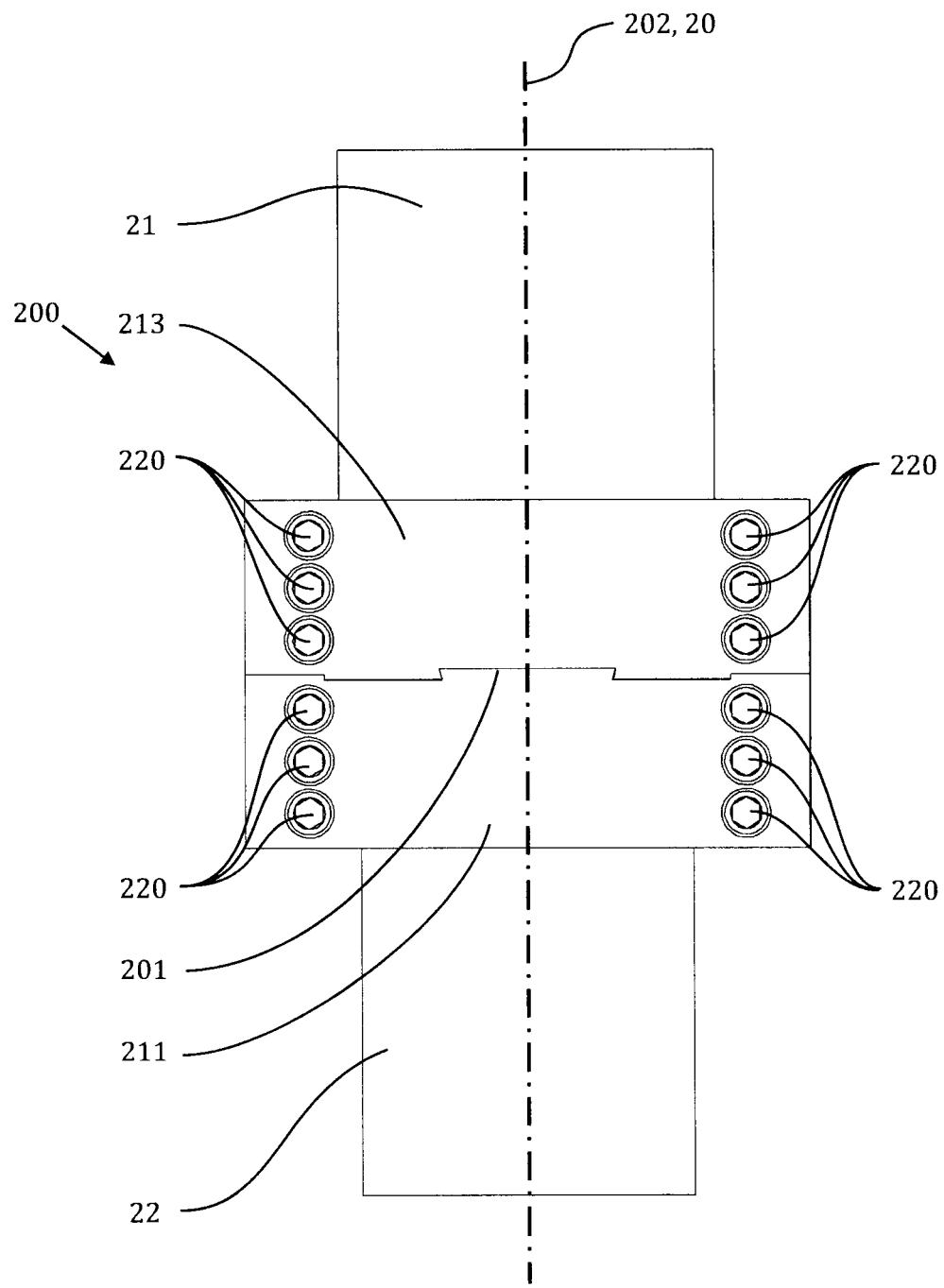
FIG. 3 is a side elevation of the clamp assembly in FIG. 1.

FIG. 3 is a side elevation of clamp assembly 200. Lower left collar segment 211 and lower right collar segment 212 are shown (by way of non-limiting example) connected to each other by a first set of six threaded fasteners 220, and upper left collar segment 213 and upper right collar segment 214 are shown connected to each other by a second set of six threaded fasteners 220.

Figure 4:
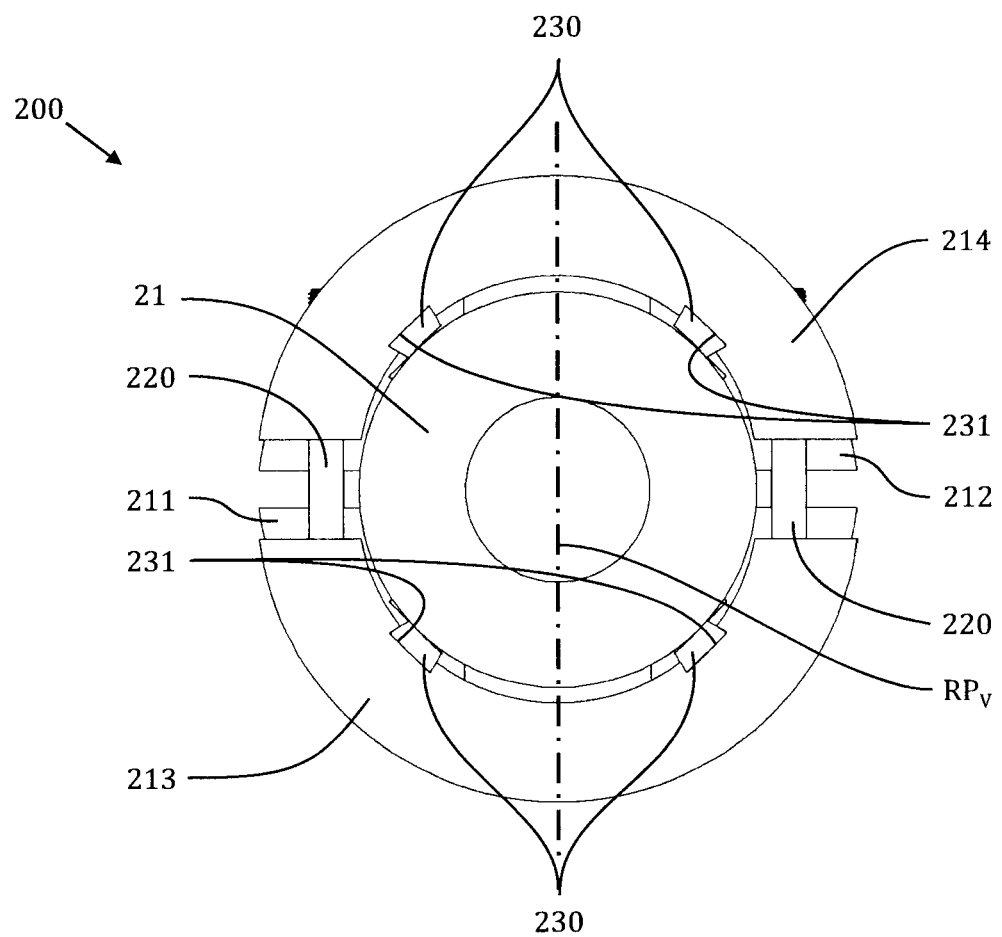
FIG. 4 is a top view of the clamp assembly in FIG. 1.

FIG. 4 is a top view of clamp assembly 200. In this embodiment, each collar segment carries two grip elements provided in the form of dies 230 which have gripping surfaces configured for gripping engagement with the circumferential outer surface of a corresponding one of workpieces 21 and 22. In the illustrated embodiment, dies 230 are shown configured in the well-known manner of "tong dies" carried in dovetail grooves 231. The size of dies 230 may be changed to alter the range of workpiece diameters that the collar assemblies can grip. Tightening fasteners 220 will increase the force with which the upper and lower collars grip upper and lower workpieces 21 and 22 respectively.

In variant embodiments, the grip elements may alternatively be provided as gripping surfaces integrally formed on the collar segments or otherwise non-removably fixed to the collar segments.

Lower left collar segment 211 defines a generally horizontal upward-facing semi-annular surface 211S, and lower right collar segment 212 defines a generally horizontal upward-facing semi-annular surface 212S. Similarly, upper left collar segment 213 defines a generally horizontal downward-facing semi-annular surface 213S, and lower right collar segment 214 defines a generally horizontal downward-facing semi-annular surface 214S. Upward-facing surface 211S on lower left collar segment 211 and downward-facing surface 213S on upper left collar segment 213 are complementarily configured for interlocking sliding engagement to form first linear slide mechanism 201 whereby lower left collar segment 211 and upper left collar segment 213 are slidingly movable relative to each other in a horizontal direction parallel to a vertical reference plane $RP_V$ coincident with the clamp assembly axis and bisecting the interlocked lower left and upper left collar segments.

Lower right collar segment 212 and upper right collar segment 214 may form a second linear slide mechanism similar to first linear slide mechanism 201, but this is optional and not essential.

The linear slide mechanism(s) will transfer force between lower left collar segment 211 and upper left collar segment 213, and between lower right collar segment 212 and upper right collar segment 213 to resist relative rotation of the upper and lower collar assemblies about clamp assembly axis 202 and, correspondingly, between upper and lower workpieces 21 and 22 about tool joint axis 20. In preferred embodiments, the linear slide mechanism(s) may be provided by interlocking sliding engagement of mating slide elements of "dovetail" configuration provided on the upward-facing and downward-facing surfaces, respectively, on the lower and upper collar segments in question. However, the linear slide mechanism(s) may be provided in any other functionally effective configuration without departing from the scope of the present disclosure.

Embodiment #2, with Rotational Symmetry About Clamp Assembly Axis

Figure 5:
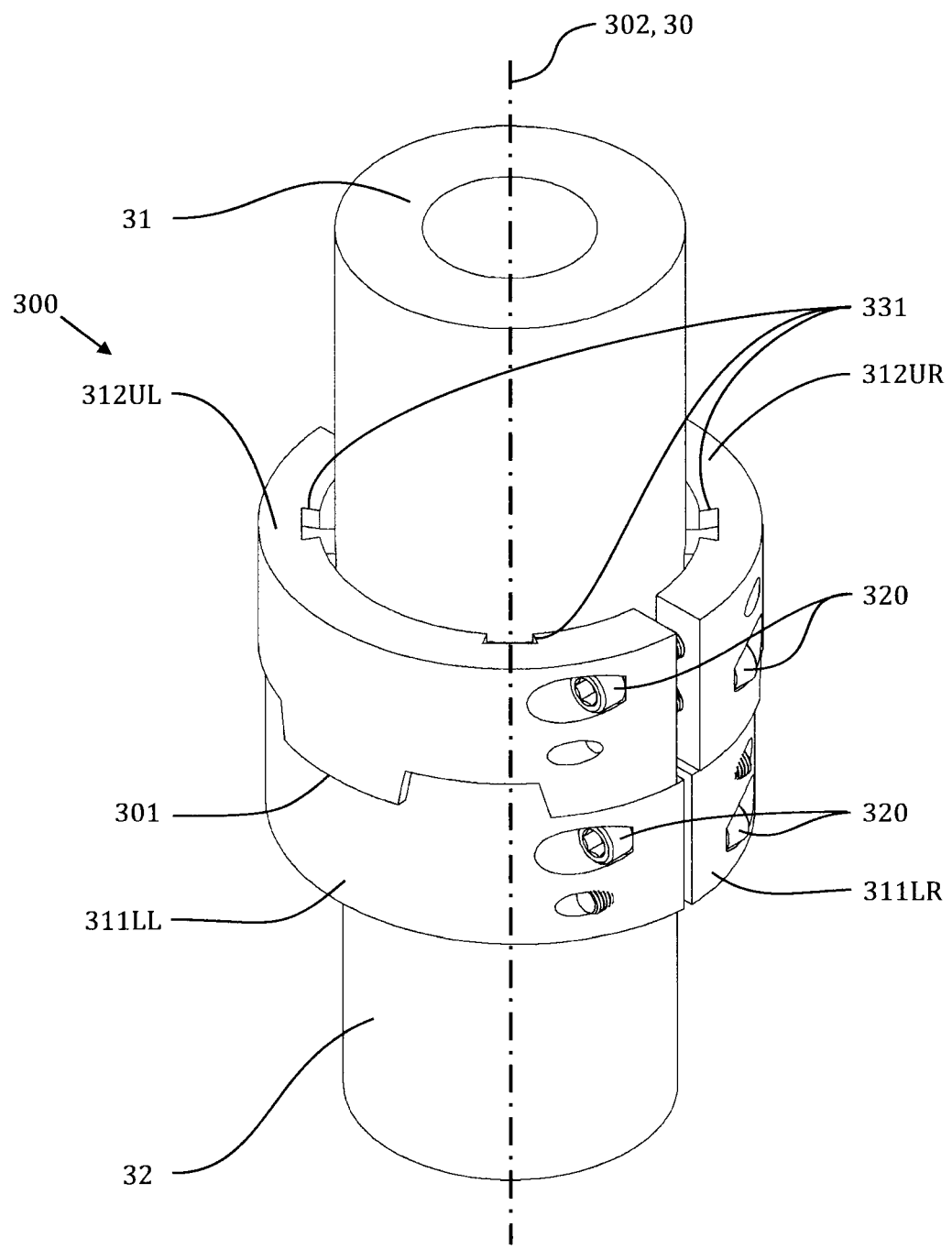
FIG. 5 is an isometric view of a second embodiment of a tool joint clamp assembly in accordance with the present disclosure, shown assembled around a tool joint, and wherein the respective left and right segments of upper and lower collar assemblies are identical and are rotationally symmetric about the clamp assembly axis.

FIG. 5 is an isometric view of a second embodiment 300 of a tool joint clamp assembly in accordance with the present disclosure. Tool joint clamp assembly 300 has a longitudinal clamp assembly axis 302, and incorporates:
  a lower collar assembly comprising a lower left collar segment 311LL and a lower right collar segment 311LR; and
  an upper collar assembly comprising an upper left collar segment 312UL and an upper right collar segment 312UR.

Clamp assembly 300 incorporates at least a first linear slide mechanism 301 functionally similar to first linear slide mechanism 201 of clamp assembly 200, previously described.

In this embodiment, lower left collar segment 311LL and lower right collar segment 311LR are identical (meaning, in the context of the present disclosure, that they are functionally interchangeable) and are rotationally symmetric about clamp assembly axis 302. Upper left and upper right collar segments 312UL and 312UR also are identical, and are rotationally symmetric about clamp assembly axis 302. Clamp assembly 300 is shown assembled on a tool joint having a longitudinal tool joint axis 30, and comprising an upper workpiece 31 and a lower workpiece 32 such that clamp assembly axis 302 is coincident with tool joint axis 30.

Figure 6:
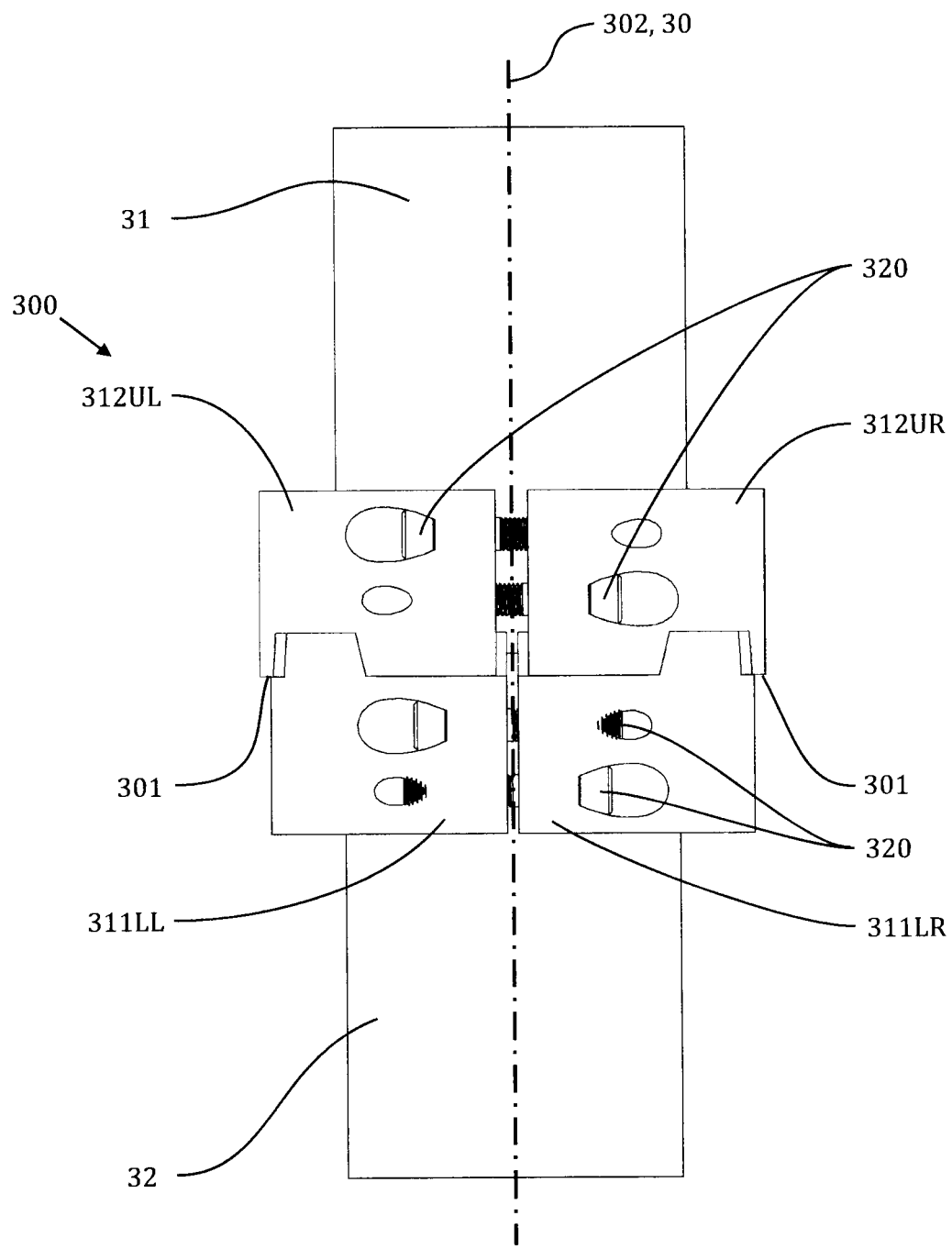
FIG. 6 is a front elevation of the clamp assembly in FIG. 5.
Figure 7:
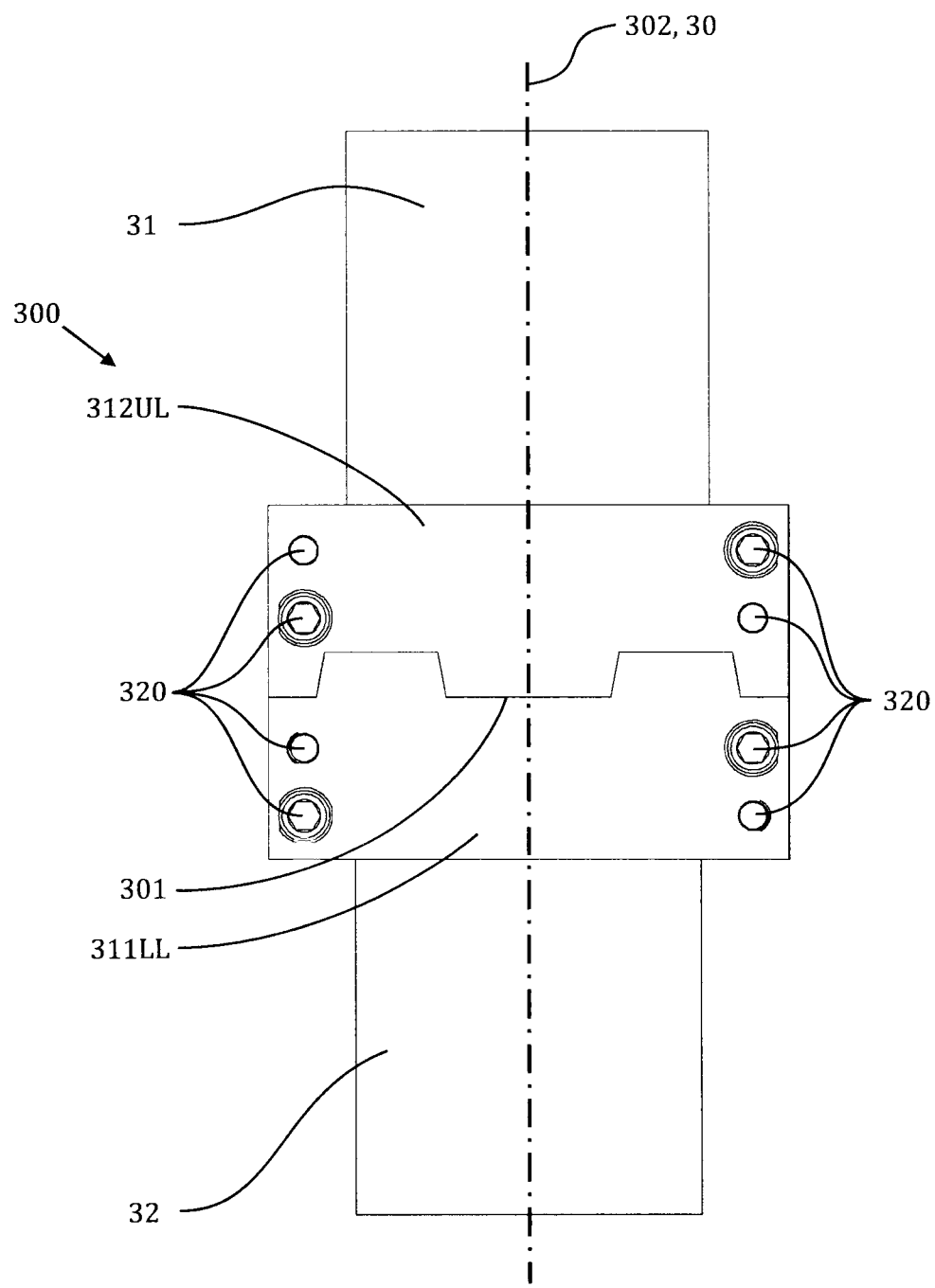
FIG. 7 is a side elevation of the clamp assembly in FIG. 5.

FIGS. 5 and 6 are front and side elevations, respectively, of clamp assembly 300, and show the upper and lower collar assemblies adapted to upper and lower workpieces 31 and 32 having different outside diameters. Lower left and lower right collar segments 311LL and 311LR are shown (by way of example) connected to each other by a first set of four threaded fasteners 320. Similarly, upper left and upper right collar segments 312UL and 312UR are shown connected to each other by a second set of four threaded fasteners 320.

Figure 8:
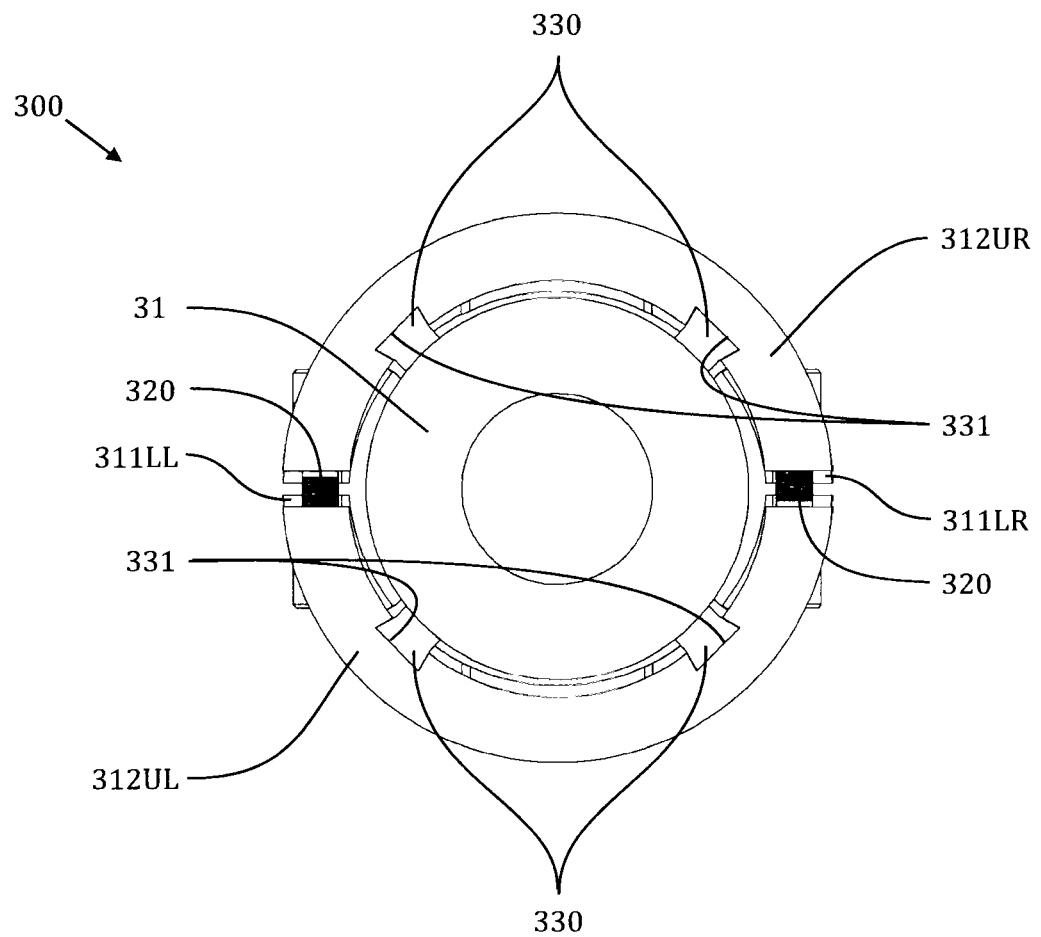
FIG. 8 is a top view of the clamp assembly in FIG. 5.

FIG. 8 is a top view of clamp assembly 300. In a manner similar to that previously described with respect to clamp assembly 200, and to provide the same functionality, each of the collar segments of clamp assembly 300 carries two grip elements provided in the form of dies 330 which have gripping surfaces for gripping engagement with one of workpieces 31 and 32.

Embodiment #3, Rotational Symmetry About a First Transverse Axis

Figure 9:
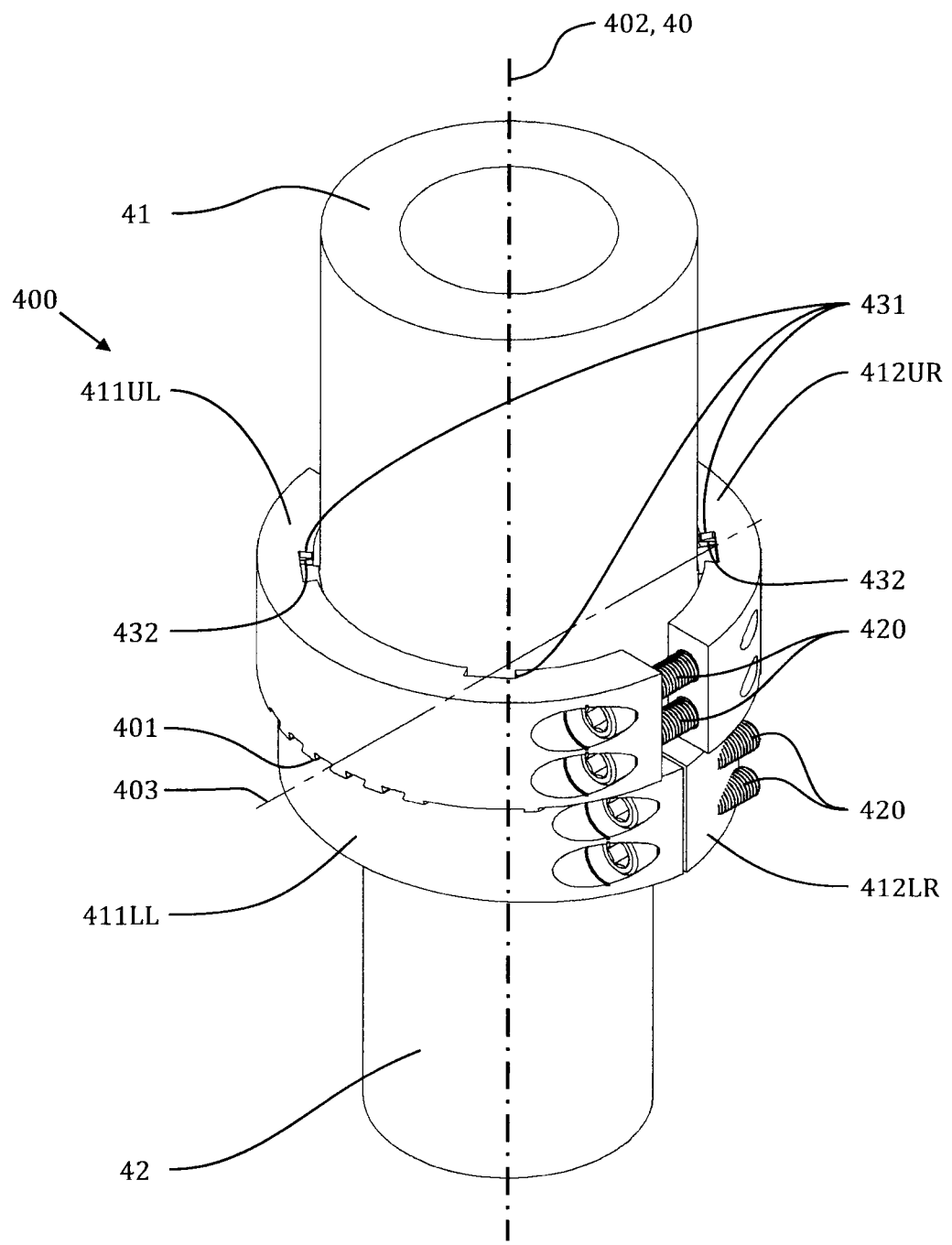
FIG. 9 is an isometric view of a third embodiment of a tool joint clamp assembly in accordance with the present disclosure, shown assembled around a tool joint, and wherein the left and right segments of the upper collar assembly are identical to the corresponding segments of the lower collar assembly, and are rotationally symmetric about a first transverse axis parallel to the sliding direction of the interlocking linear slide mechanism.

FIG. 9 is an isometric view of a third embodiment 400 of a tool joint clamp assembly in accordance with the present disclosure. Tool joint clamp assembly 400 has a longitudinal clamp assembly axis 402, and incorporates:
  a lower collar assembly comprising a lower left collar segment 411LL and a lower right collar segment 411LR; and
  an upper collar assembly comprising an upper left collar segment 412UL and an upper right collar segment 412UR.

Clamp assembly 400 incorporates at least a first linear slide mechanism 401 functionally similar to first linear slide mechanism 201 of clamp assembly 200, previously described.

In this embodiment, lower left and upper left collar segments 411LL and 411UL are identical, and are rotationally symmetric about a first transverse axis 403 that lies in a horizontal reference plane $RP_H$ generally defined by the upward-facing and downward facing semi-annular surfaces, respectively, of the interlocked lower left and upper left collar segments 411LL and 411UL, and is perpendicular to clamp assembly axis 402 and parallel to the sliding direction of linear slide mechanism 401. Additionally, upper right and lower right collar segments 412UR and 412LR are identical and are rotationally symmetric about transverse axis 403. Clamp assembly 400 is shown assembled around a tool joint having a longitudinal tool joint axis 40, and comprising an upper workpiece 41 and a lower workpiece 42 such that clamp assembly axis 402 is coincident with tool joint axis 40.

In a variant of this embodiment, lower right and upper right collar segments 412LR and 414UR do not form an interlocking linear slide mechanism.

Figure 10:
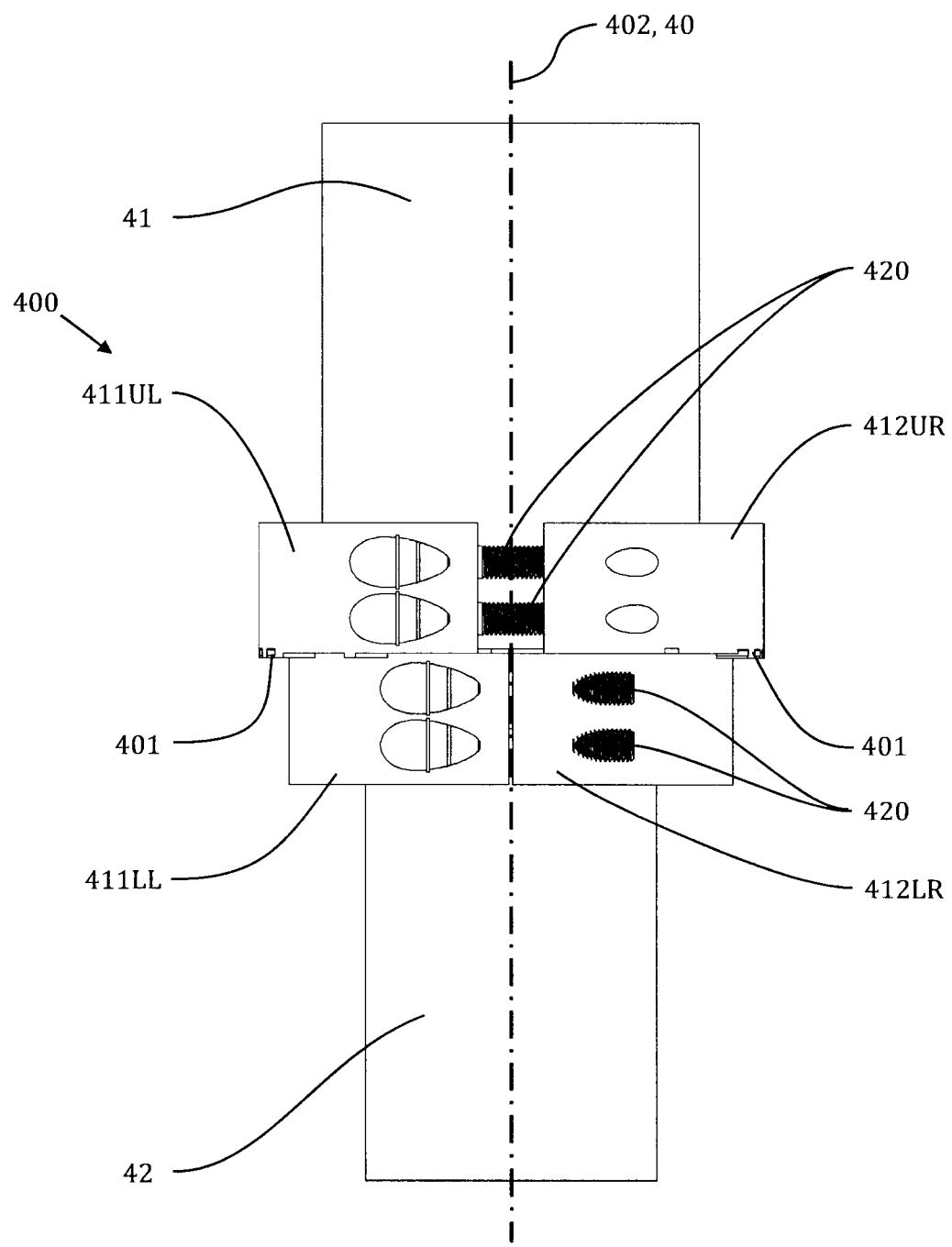
FIG. 10 is a front elevation of the clamp assembly in FIG. 9.
Figure 11:
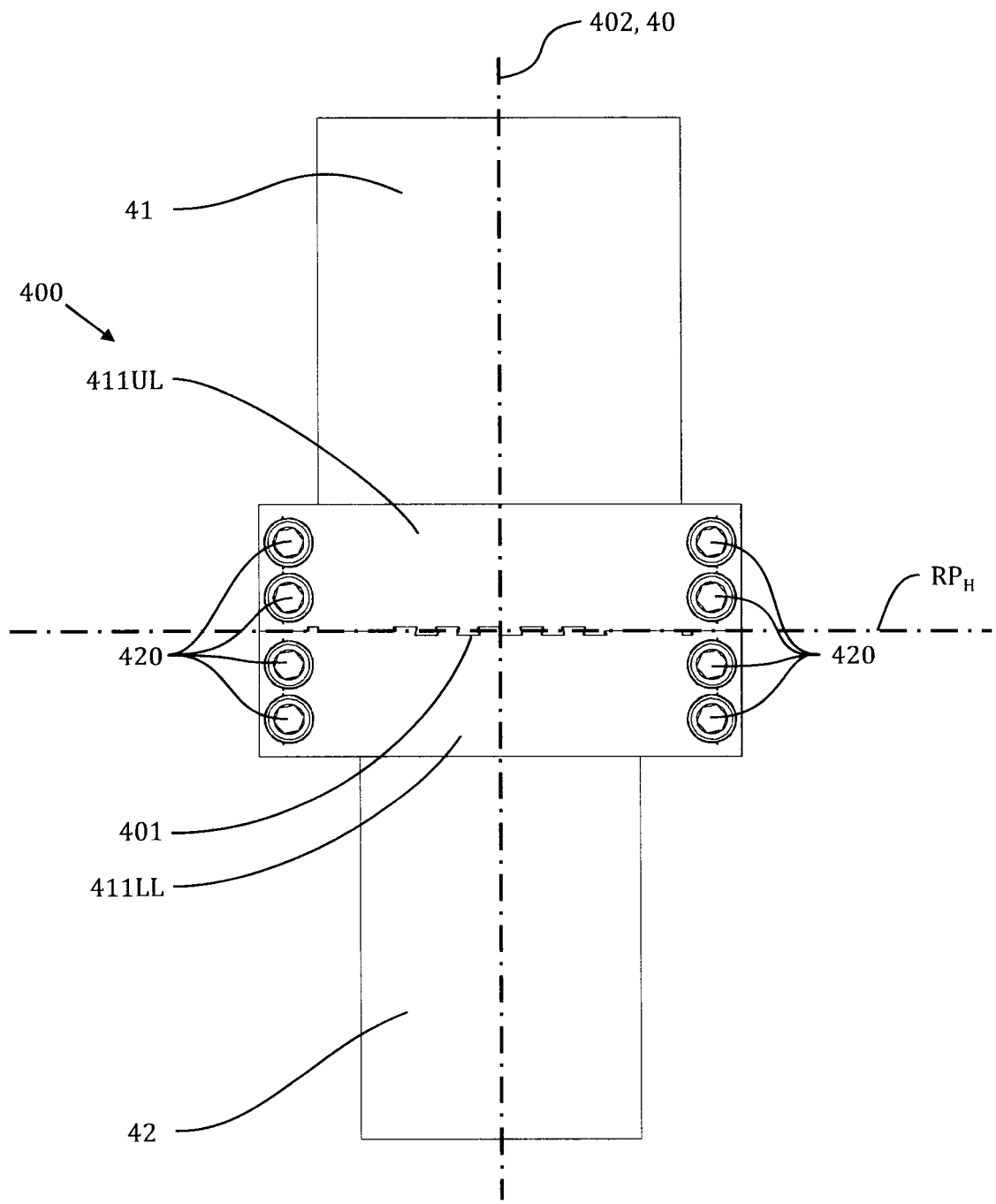
FIG. 11 is a side elevation of the clamp assembly in FIG. 9.

FIGS. 10 and 11 are front and side elevation, respectively, of clamp assembly 400, and illustrate the upper and lower collar assemblies adapted to upper and lower workpieces 41 and 42 having different outside diameters. Lower left and lower right collar segments 411LL and 412LR are shown connected to each other by a first set of four threaded fasteners 420. Similarly, upper left and upper right collar segments 411UL and 412UR are shown connected to each other by a second set of four threaded fasteners 420.

Figure 12:
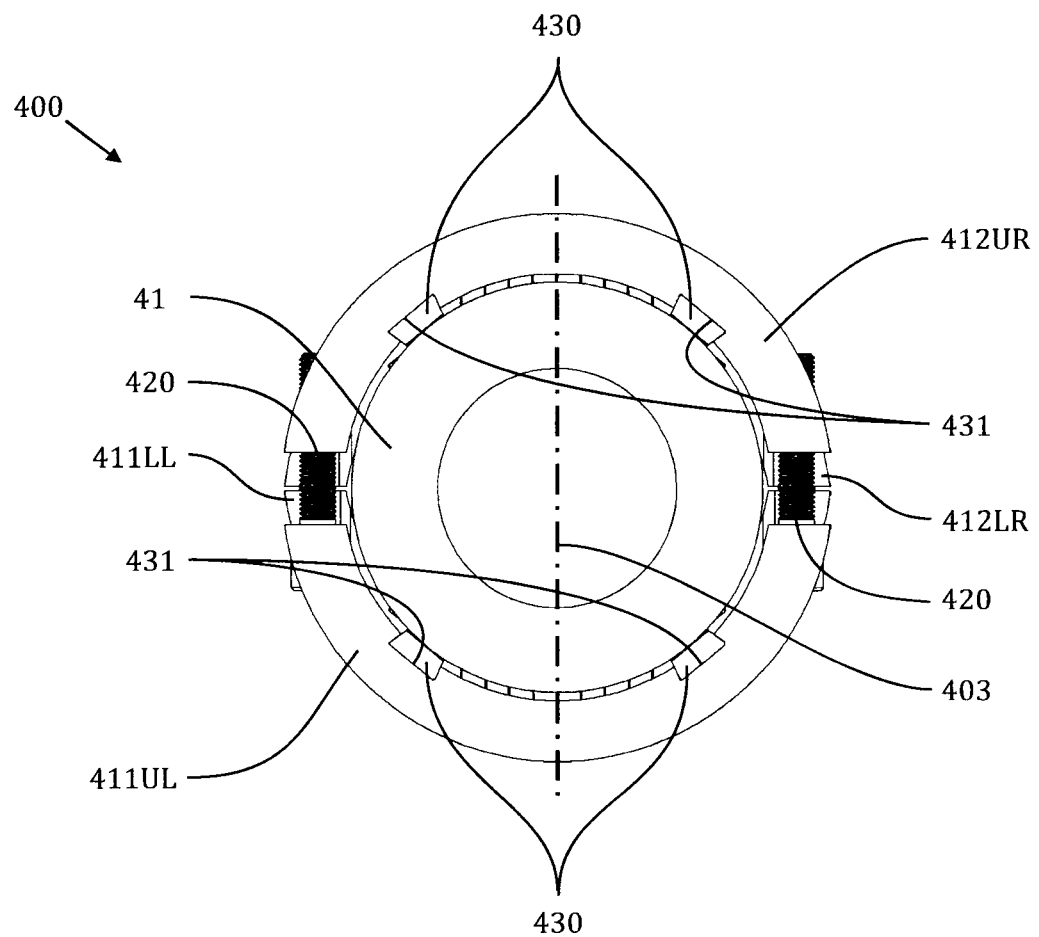
FIG. 12 is a top view of the clamp assembly in FIG. 9.

FIG. 12 is a top view of clamp assembly 400. In a manner similar to that previously described with respect to clamp assembly 200, and to provide the same functionality, each of the collar segments of clamp assembly 400 carries two grip elements provided in the form of dies 430 which have gripping surfaces for gripping engagement with one of workpieces 41 and 42.

Dovetail grooves 431 are provided with slots 432 into which retaining clips (not shown) may be installed to prevent dies 430 from sliding axially out of dovetail grooves 431, with the retaining clips preferably being configured for an interference fit with slots 432 to retain them in place.

Figure 13:
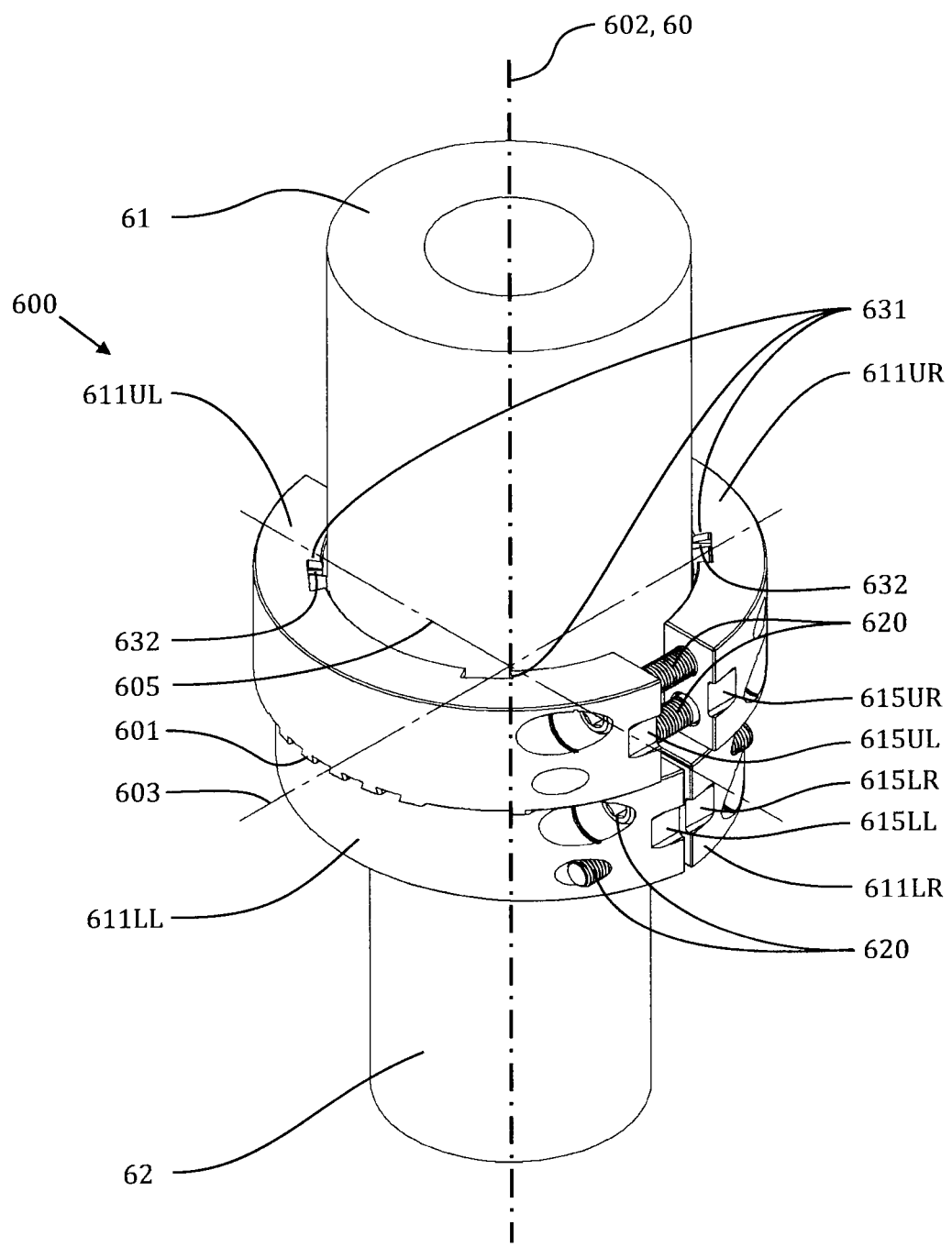
FIG. 13 is an isometric view of a fourth embodiment of a tool joint clamp assembly in accordance with the present disclosure, shown assembled around a tool joint, and wherein the segments of the lower and upper collar assemblies are identical and are rotationally symmetric about the clamp assembly axis and about the first transverse axis.

Embodiment #4, with Collar Rotational Symmetry About Clamp Assembly Axis and About Transverse Axes FIG. 13 is an isometric view of a fourth embodiment 600 of a tool joint clamp assembly in accordance with the present disclosure. Tool joint clamp assembly 600 has a longitudinal clamp assembly axis 602, and incorporates:
- a lower collar assembly comprising a lower left collar segment 611LL and a lower right collar segment 611LR; and
- an upper collar assembly comprising an upper left collar segment 611UL and an upper right collar segment 611UR.

Clamp assembly 600 incorporates at least a first linear slide mechanism 601 functionally similar to first linear slide mechanism 201 of clamp assembly 200, previously described.

In this embodiment, lower left collar segment 611LL, lower right collar segment 611LR, upper left collar segment 611UL, and upper right collar segment 611UR are identical, and are rotationally symmetric about clamp assembly axis 602, and about a first transverse axis 603 that lies in a horizontal reference plane $RP_H$ generally defined by the upward-facing and downward facing semi-annular surfaces, respectively, of the interlocked lower left and upper left collar segments, and is perpendicular to clamp assembly axis 602 and parallel to the sliding direction of linear slide mechanism 601. Clamp assembly 600 is shown assembled on a tool joint having a longitudinal tool joint axis 60, and comprising an upper workpiece 61 and a lower workpiece 62 such that clamp assembly axis 602 is coincident with tool joint axis 60.

Figure 14:
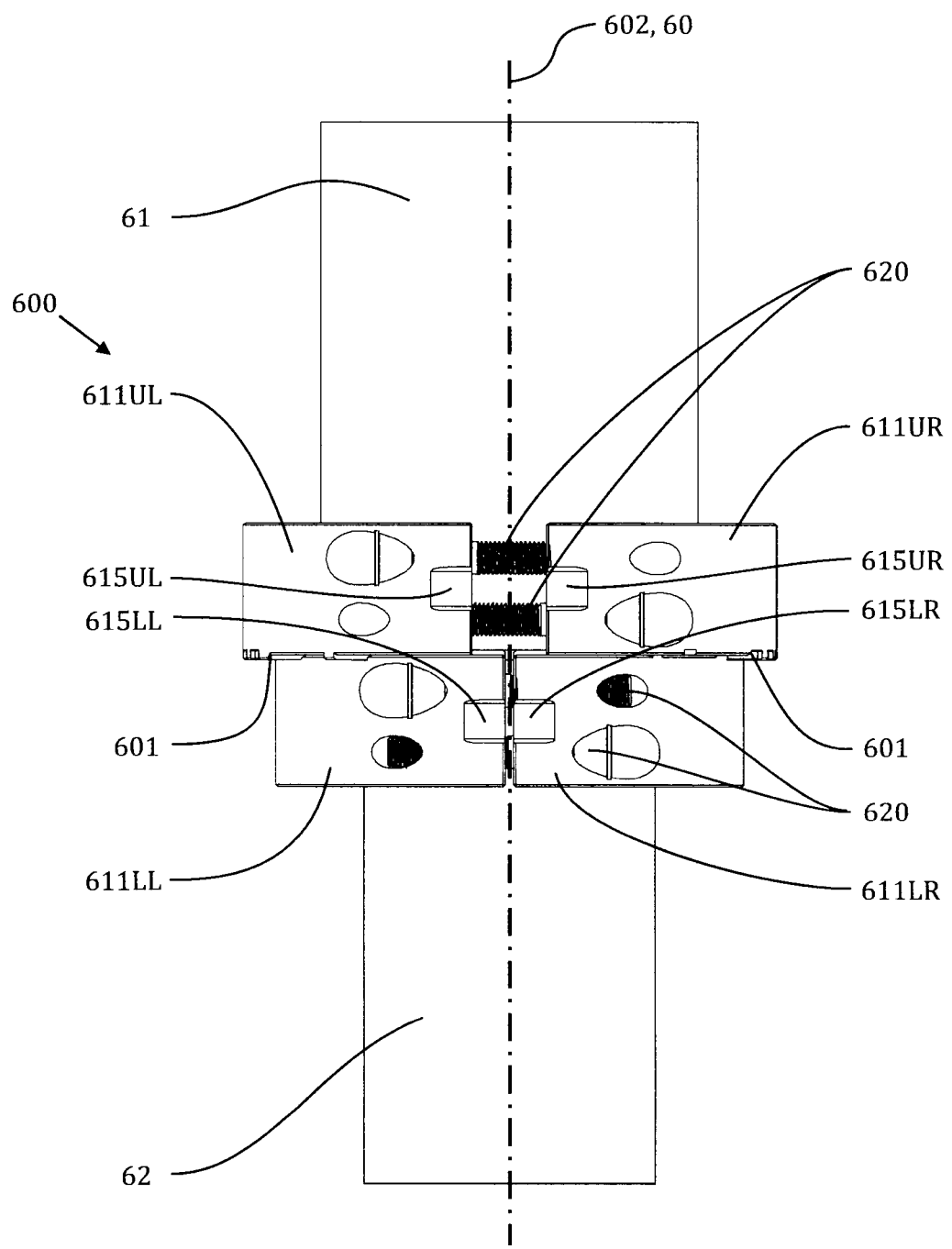
FIG. 14 is a front elevation of the clamp assembly in FIG. 13.
Figure 15:
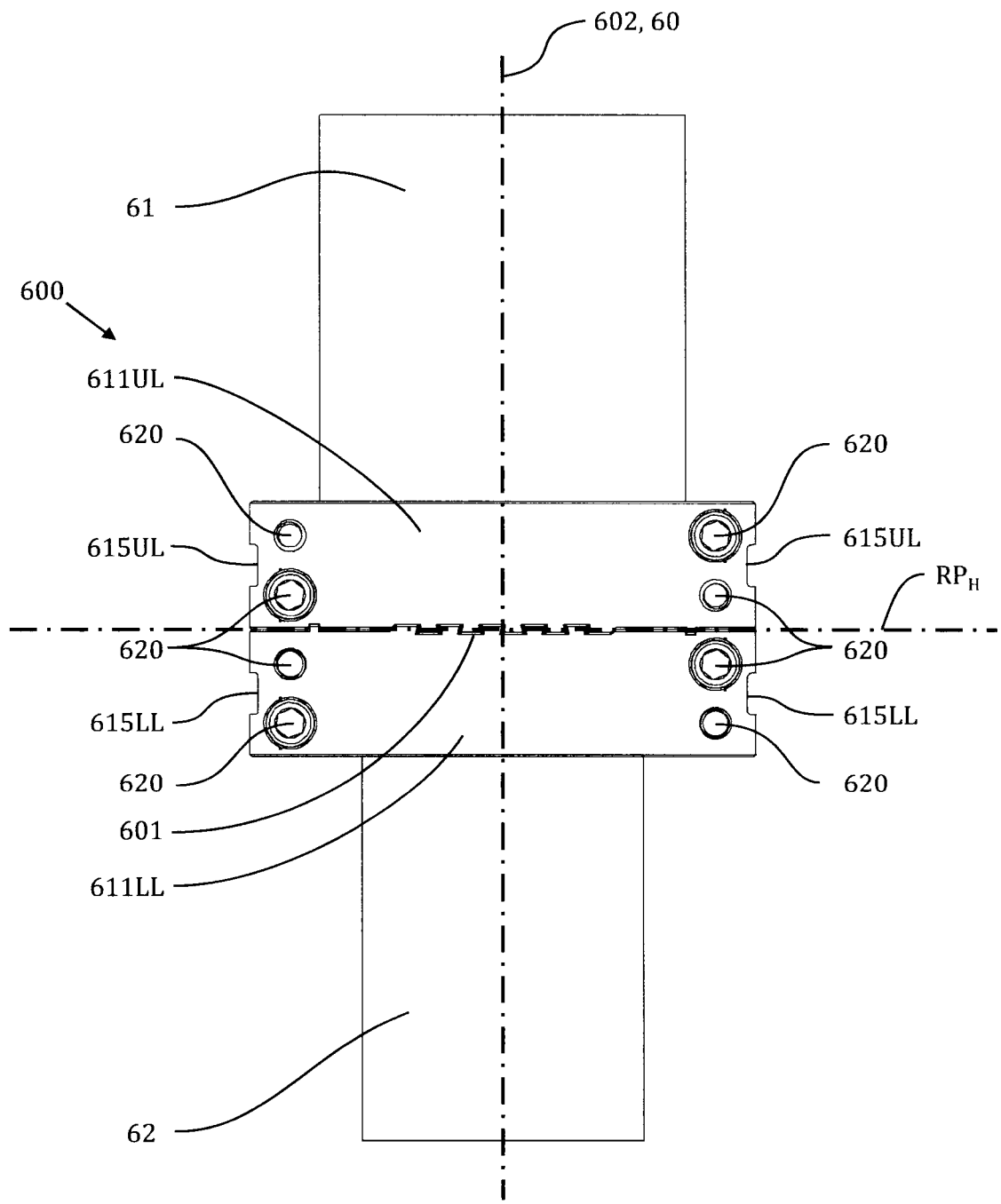
FIG. 15 is a side elevation of the clamp assembly in FIG. 13.

FIGS. 14 and 15 are front and side elevations, respectively, of clamp assembly 600, and show the upper and lower collar assemblies adapted to upper and lower workpieces 61 and 62 having different outside diameters. Lower left and lower right collar segments 611LL and 611LR are shown connected to each other by a first set of four threaded fasteners 620. Similarly, upper left and upper right collar segments 611UL and 611UR are connected to each other by a second set of four threaded fasteners 620.

Figure 16:
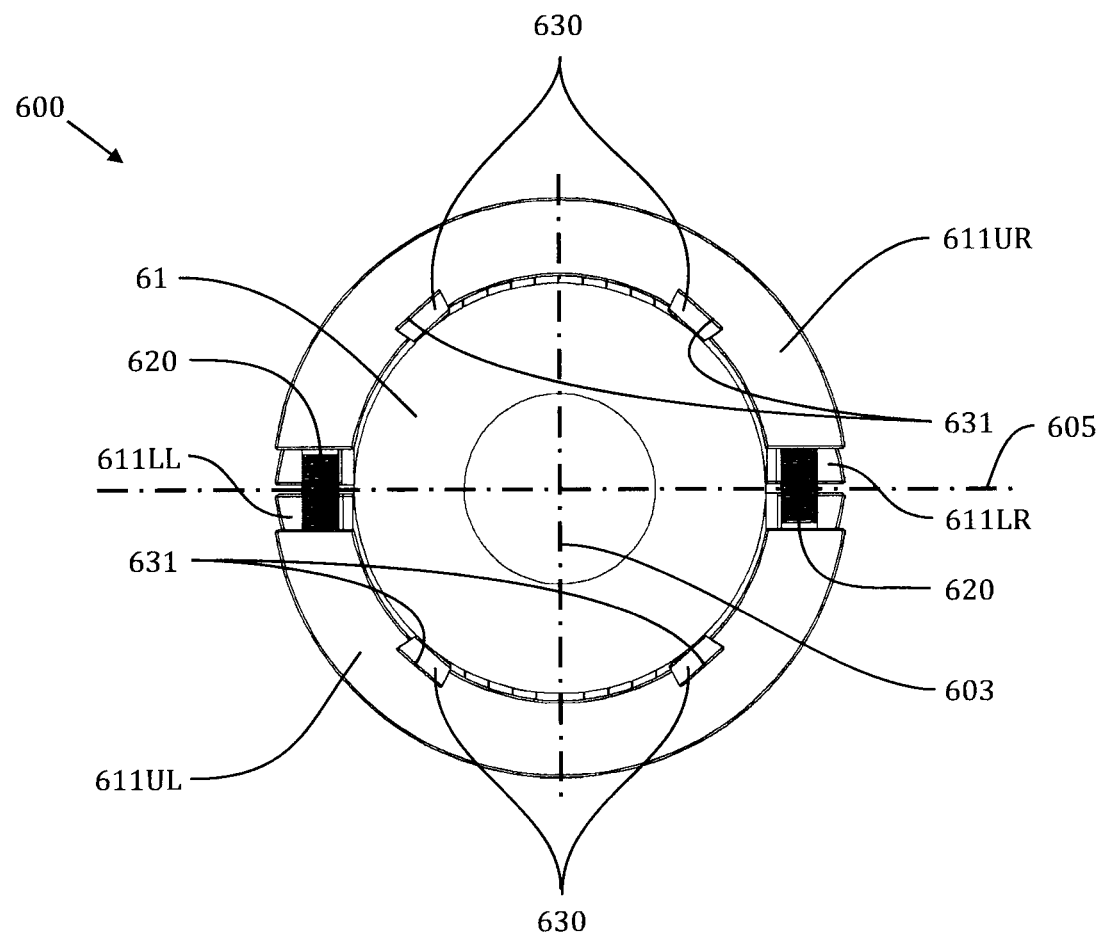
FIG. 16 is a top view of the clamp assembly in FIG. 13.

FIG. 16 is a top view of clamp assembly 600. In a manner similar to that previously described with respect to clamp assembly 200, and to provide the same functionality, each of the collar segments of clamp assembly 600 carries two grip elements provided in the form of dies 630 which have gripping surfaces for gripping engagement with one of workpieces 61 and 62.

Dovetail grooves 631 are provided with slots 632 into which retaining clips (not shown) may be installed to prevent dies 630 from sliding axially out of dovetail grooves 631, where the retaining clips preferably being configured for an interference fit with slots 632 to retain them in place.

Gauging surfaces 615LL, 615LR, 615UL, and 615UR are provided on each end of collar segments 611LL, 611LR, 611UL, and 611UR, respectively, for measurement of the deformation of each collar segment when fasteners 620 are tightened. A measurement device, such as a suitably-sized outside micrometer or vernier caliper, may be adapted to measure the magnitudes of deformation of the collar segments, and the measured magnitudes of deformation can be used to determine the gripping force. Dimensional gauges may be used to determine:
- whether the deformation of a collar segment is greater than a first threshold, and thereby to confirm whether the gripping force is greater than a minimum desired value; and
- whether the deformation of a collar segment is less than a second threshold, and thereby to confirm whether the gripping force is less than a maximum desired value.

Figure 17:
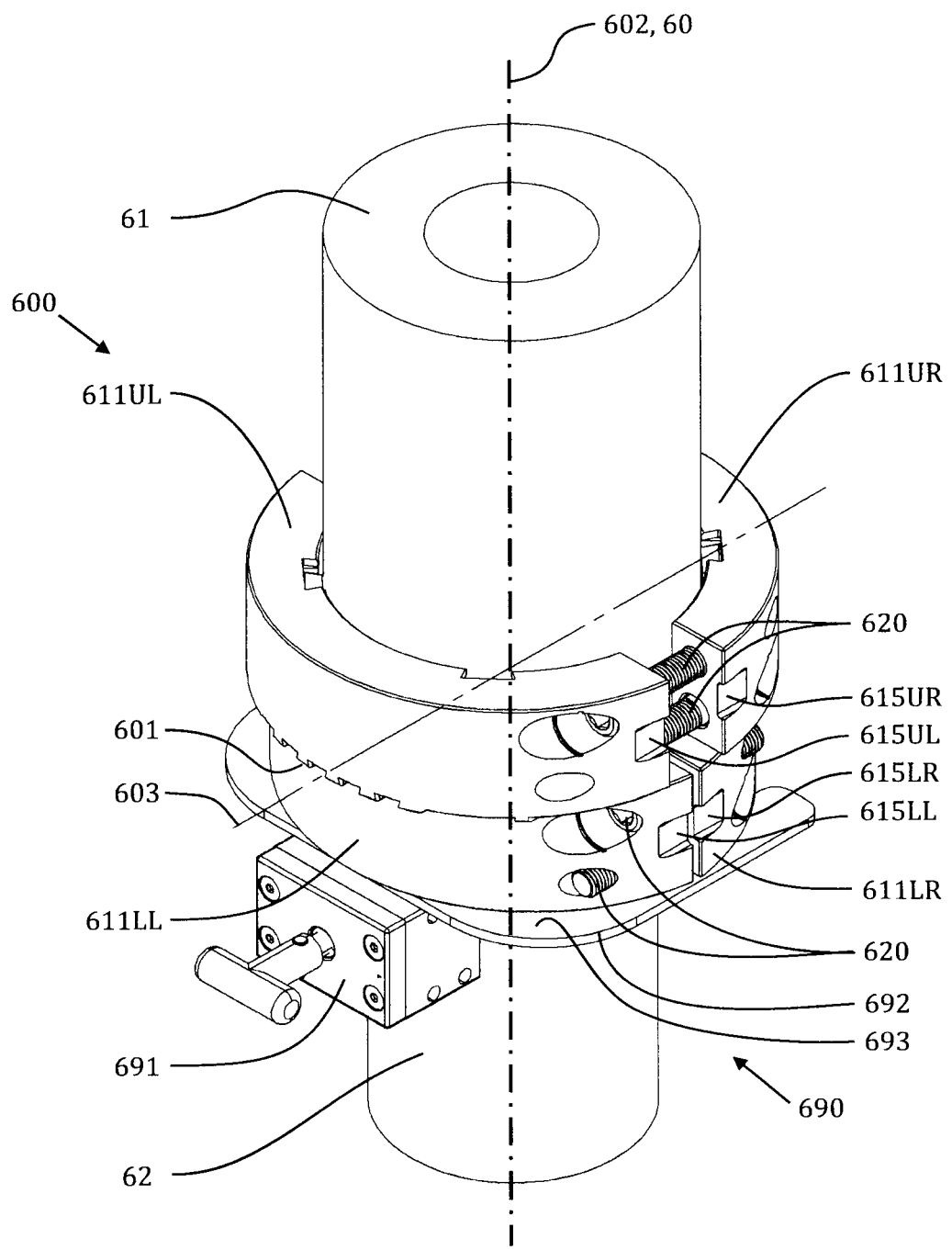
FIG. 17 is an isometric view of the tool joint clamp assembly in FIG. 13 with the addition of a support device that facilitates assembly and disassembly of the clamp assembly around or from the tool joint by supporting the collar segments when the threaded fasteners are not tight.

FIG. 17 is an isometric view of clamp assembly 600 used in conjunction with a support device 690 that facilitates assembly or disassembly of clamp assembly 600 around or from the tool joint by supporting the collar segments when threaded fasteners 620 are not tight during the assembly or disassembly stage. Support device 690 comprises an attachment element 691 and a support platform element 692. Attachment element 691 may comprise a commonly available lifting magnet to support device 690 to lower workpiece 62. Support platform element 692 provides a support surface 693 upon which the collar segments may rest when threaded fasteners 260 are not tight.

When clamp assembly 600 is assembled on a tool joint comprising upper and lower workpieces of the same diameter, collar segments 611UL and 611LR and collar segments 611LL and 611UR are also rotationally symmetric about a second transverse axis 605 that lies in horizontal reference plane $RP_H$, is perpendicular to and intersects clamp assembly axis 602, and is perpendicular to the sliding direction of interlocking linear slide mechanism 601.

Embodiment #5, with Barrel Nuts and Barrel Washers to Facilitate Mounting

Figure 18:
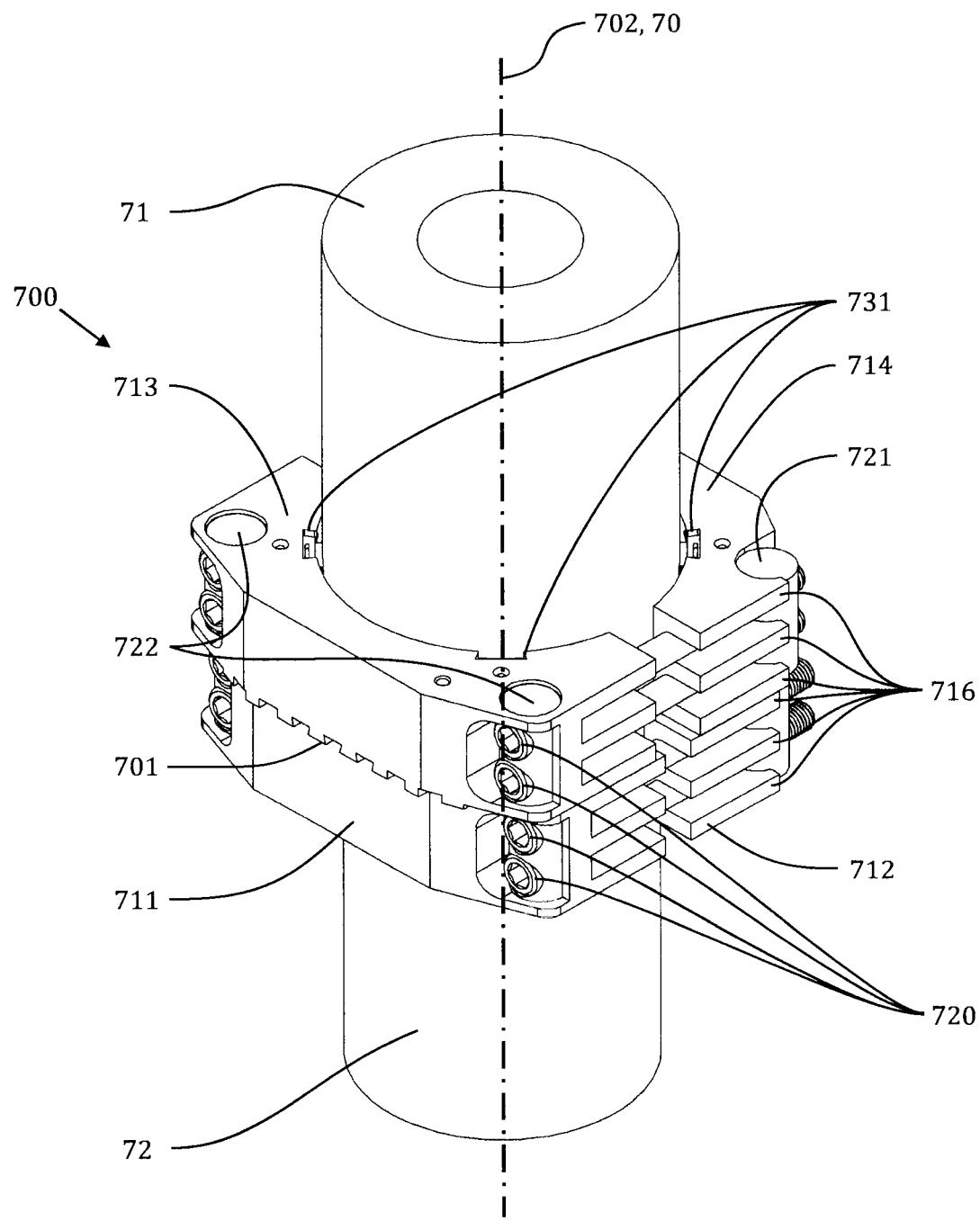
FIG. 18 is an isometric view of a fifth embodiment of a tool joint clamp assembly in accordance with the present disclosure, shown assembled around a tool joint, and wherein the threaded fasteners are used with barrel nuts and barrel washers to facilitate assembly of the clamp assembly around the tool joint and to accommodate angular misalignment between the collar segments of a collar assembly.

FIG. 18 is an isometric view of a fifth embodiment 700 of a tool joint clamp assembly in accordance with the present disclosure. Clamp assembly 700 has a longitudinal clamp assembly axis 703, and incorporates:
- a lower collar assembly comprising a lower left collar segment 711 and a lower right collar segment 712; and
- an upper collar assembly comprising an upper left collar segment 713 and an upper right collar segment 714.

Clamp assembly 700 incorporates at least a first linear slide mechanism 701 functionally similar to first linear slide mechanism 201 of clamp assembly 200, previously described. Clamp assembly 700 is shown assembled around a tool joint having a longitudinal tool joint axis 70, and comprising an upper workpiece 71 and a lower workpiece 72 such that clamp assembly axis 702 is coincident with tool joint axis 70.

In this embodiment, threaded fasteners 720 may be loosely assembled with barrel nuts 721 and barrel washers 722 to facilitate mounting of the clamp assembly around the tool joint and accommodate angular misalignment between the two segments of a given collar assembly.

Figure 19:
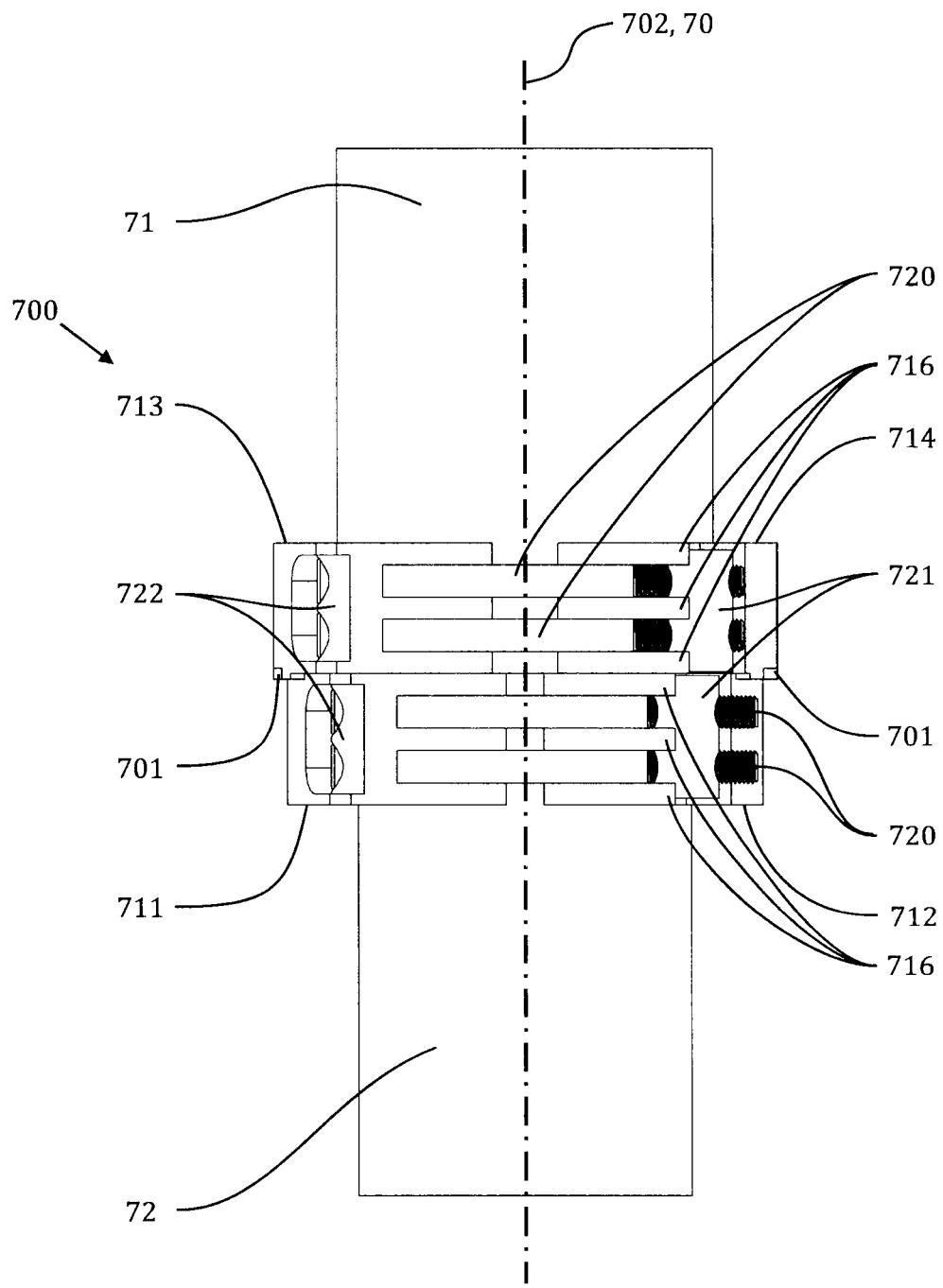
FIG. 19 is a front elevation of the clamp assembly in FIG. 18.
Figure 20:
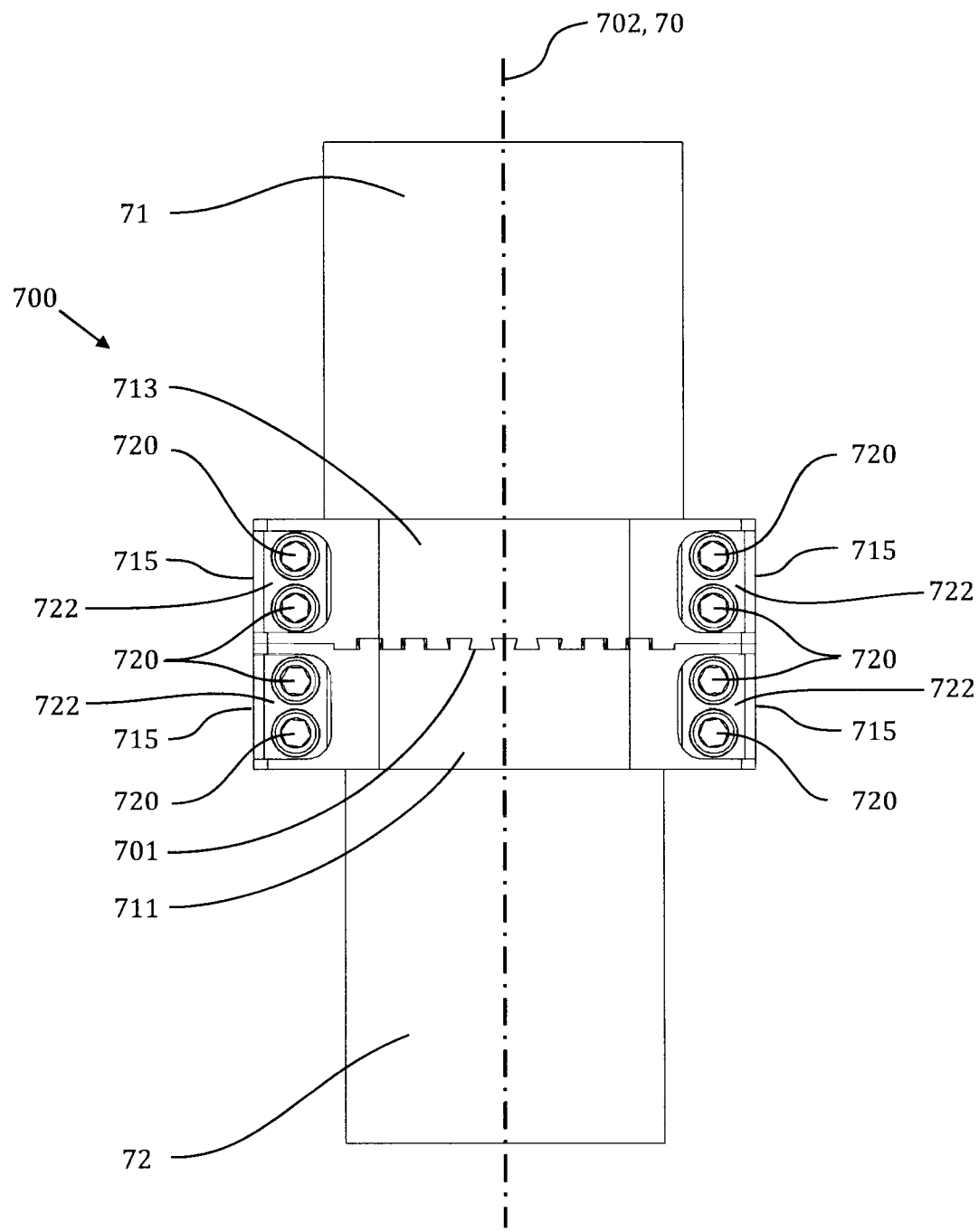
FIG. 20 is a side elevation of the clamp assembly in FIG. 18.

FIGS. 19 and 20 are front and side elevations, respectively, of clamp assembly 700, and show the upper and lower collar assemblies adapted to upper and lower workpiece 71 and 72 having different outside diameters. Lower left collar segment 711 and lower right collar segment 712 are shown connected to each other by a first set of four threaded fasteners 720. Similarly, upper left collar segment 713 and upper right collar segment 714 are shown connected to each other by a second set of four threaded fasteners 720.

Lower left collar segment 711 and upper left collar segment 713 are configured with holes that captively retain the loosely-assembled fasteners 720, barrel washers 722, and barrel nuts 721. Lower right collar segment 712 and upper right collar segment 714 are configured with hooks 715 that permit the loosely-assembled fasteners 720, barrel washers 722, and barrel nuts 721 to quickly latch lower right collar segment 712 and upper right collar segment 714, and securely hold retain barrel nuts 721 while fasteners 720 are tightened.

Figure 21:
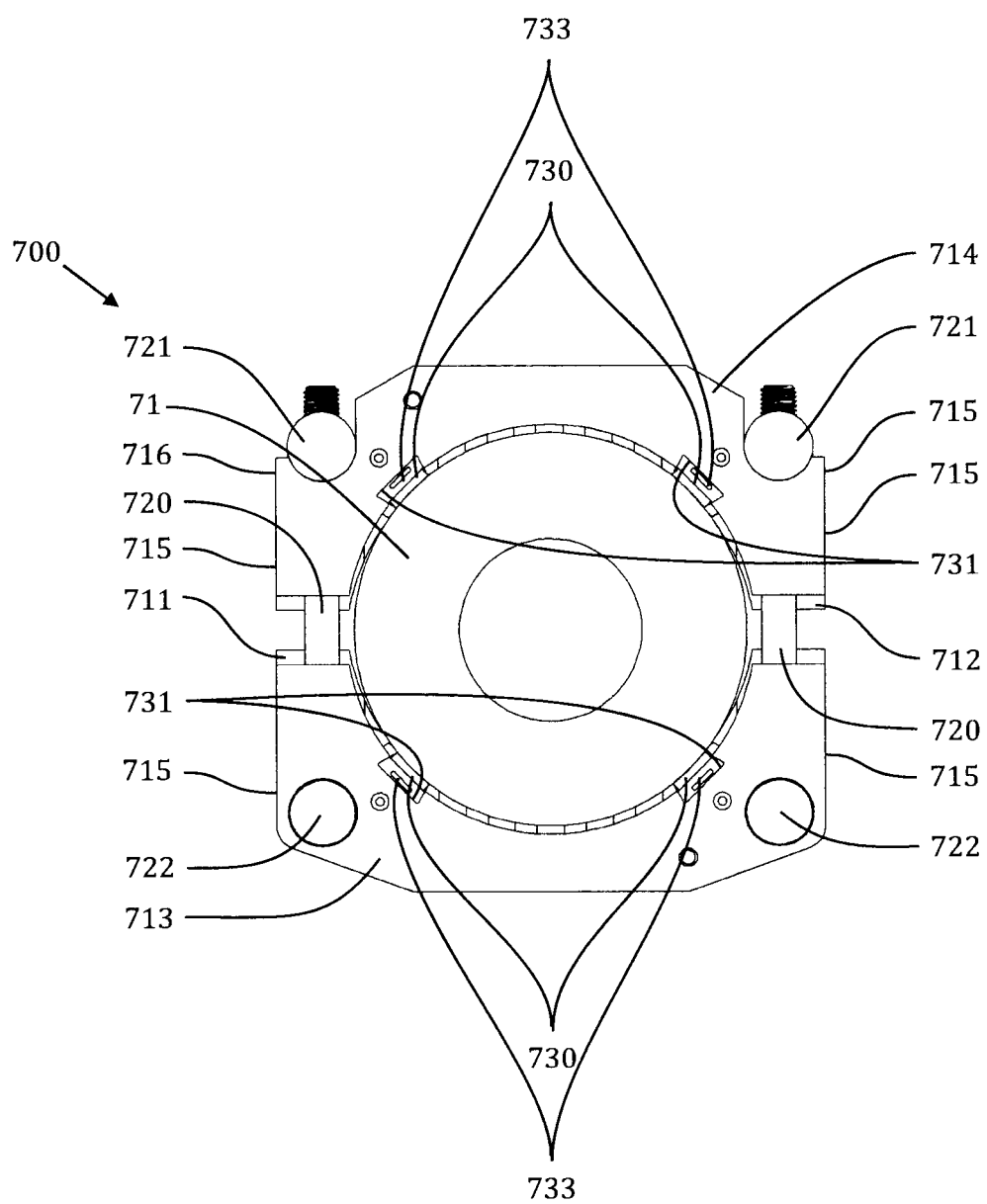
FIG. 21 is a top view of the clamp assembly in FIG. 18.

FIG. 21 is a top view of clamp assembly 700. Each collar segment of clamp assembly 700 carries two grip elements provided in the form of dies 730 which have gripping surfaces for gripping engagement with one of workpieces 71 and 72.

Dovetail grooves 731 are shown provided with slots into which retaining clips 733 are placed to prevent dies 730 from sliding axial out of dovetail grooves 731, retaining clips 733 preferably being configured for an interference fit with slots 732 to retain them in place.

It will be readily appreciated by persons skilled in the art that various modifications to embodiments in accordance with the present disclosure may be devised without departing from the scope of the present teachings, including modifications that use equivalent structures or materials hereafter conceived or developed.

It is especially to be understood that the scope of the present disclosure is not intended to be limited to described or illustrated embodiments, and that the substitution of a variant of any claimed or illustrated element or feature, without any substantial resultant change in functionality, will not constitute a departure from the scope of the disclosure. For example, while the Figures show upper workpieces having a larger outside diameter than the lower workpieces, all embodiments in accordance with this disclosure are readily adaptable to threaded connections where the upper workpiece has a smaller outside diameter than the lower workpiece.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

Any use herein of any form of the terms "connect", "engage", "mount", "attach", or any other term describing an interaction between elements is not meant to limit the interaction to direct interaction between the subject elements, and may also include indirect interaction between the elements such as through secondary or intermediary structure.

Relational and conformational terms such as (but not limited to) "parallel", "perpendicular", "vertical", "horizontal", "axial", "cylindrical", "semi-cylindrical", "symmetric", and "coincident" are not intended to denote or require absolute mathematical or geometrical precision. Accordingly, such terms are to be understood as denoting or requiring substantial precision only (e.g., "substantially perpendicular" or "generally symmetric") unless the context clearly requires otherwise. Unless specifically noted otherwise, any reference to an element being "generally cylindrical" is intended to denote that the element in question would appear substantially cylindrical in transverse cross-section, although the cross-sectional configuration of the element may vary along its length.

Wherever used in this document, the terms "typical" and "typically" are to be understood and interpreted in the sense of being representative of common usage or practice, and are not to be understood or interpreted as implying essentiality or invariability.

LIST OF ILLUSTRATED ELEMENTS

| Element Number | Description |
| --- | --- |
| $RP_H$ | horizontal reference plane |
| $RP_V$ | vertical reference plane |
| 20 | tool joint axis |
| 21 | upper workpiece |
| 22 | lower workpiece |
| 200 | tool joint clamp assembly |
| 201 | interlocking linear slide mechanism |
| 202 | clamp assembly axis |
| 211 | lower left collar segment |
| 211S | upward-facing semi-annular surface |
| 212 | lower right collar segment |
| 212S | upward-facing semi-annular surface |
| 213 | upper left collar segment |
| 213S | downward-facing semi-annular surface |
| 214 | upper right collar segment |
| 214S | downward-facing semi-annular surface |
| 220 | threaded fastener |
| 230 | workpiece gripping element (die insert) |
| 231 | dovetail groove for gripping element |
| 30 | tool joint axis |
| 31 | upper workpiece |
| 32 | lower workpiece |
| 300 | tool joint clamp assembly |
| 301 | interlocking linear slide mechanism |
| 302 | clamp assembly axis |
| 311LL | lower left collar segment |
| 311LR | lower right collar segment |
| 312UL | upper left collar segment |
| 312UR | upper right collar segment |
| 320 | threaded fastener |
| 330 | workpiece gripping element (die insert) |
| 331 | dovetail groove for gripping element |

LIST OF ILLUSTRATED ELEMENTS
(CONTINUED)

| Element Number | Description |
| --- | --- |
| 40 | tool joint axis |
| 41 | upper workpiece |
| 42 | lower workpiece |
| 400 | tool joint clamp assembly |
| 401 | interlocking linear slide mechanism |
| 402 | clamp assembly axis |
| 403 | transverse axis perpendicular to clamp assembly axis |
| 411LL | lower left collar segment |
| 411UL | upper left collar segment |
| 412LR | lower right collar segment |
| 412UR | upper right collar segment |
| 420 | threaded fastener |
| 430 | workpiece gripping element (die insert) |
| 431 | dovetail groove for gripping element |
| 432 | slot for gripping element retaining clip |
| 60 | tool joint axis |
| 61 | upper workpiece |
| 62 | lower workpiece |
| 600 | tool joint clamp assembly |
| 601 | interlocking linear slide mechanism |

-continued

| Element Number | Description |
| --- | --- |
| 602 | clamp assembly axis |
| 603 | first transverse axis |
| 605 | second transverse axis |
| 611LL | lower left collar segment |
| 611UL | upper left collar segment |
| 611LR | lower right collar segment |
| 611UR | upper right collar segment |
| 615LL | lower left clamping force gauging surface |
| 615UL | upper left clamping force gauging surface |
| 615LR | lower right clamping force gauging surface |
| 615UR | upper right clamping force gauging surface |

LIST OF ILLUSTRATED ELEMENTS
(CONTINUED)

| Element Number | Description |
| --- | --- |
| 620 | threaded fastener |
| 630 | workpiece gripping element (die insert) |
| 631 | dovetail groove for gripping element |
| 632 | slot for gripping element retaining clip |
| 690 | clamp assembly support device |
| 691 | attachment element |
| 692 | support platform element |
| 693 | support surface |
| 70 | tool joint axis |
| 71 | upper workpiece |
| 72 | lower workpiece |
| 700 | tool joint clamp assembly |
| 701 | interlocking linear slide mechanism |
| 702 | clamp assembly axis |
| 711 | lower left collar segment |
| 712 | lower right collar segment |
| 713 | upper left collar segment |
| 714 | upper right collar segment |
| 715 | clamping force gauging surface |
| 716 | hook for barrel nut |
| 720 | threaded fastener |
| 721 | barrel nut |
| 722 | barrel washer |
| 730 | workpiece gripping element (die insert) |
| 731 | dovetail groove for gripping element |
| 733 | gripping element retaining clip |

What is claimed is:

1. A clamp assembly for mounting on a tool joint comprising coaxially-aligned cylindrical upper and lower workpieces and having a tool joint axis, said clamp assembly having a clamp assembly axis and comprising a cylindrical lower collar assembly and a cylindrical upper collar assembly, wherein:
   (a) the lower collar assembly comprises a semi-cylindrical lower left collar segment and a semi-cylindrical lower right collar segment, wherein:
      (a.1) the lower left and lower right collar segments are removably connectable to each other by threaded fasteners to form the cylindrical lower collar assembly; and
      (a.2) the lower collar assembly is coaxially mountable around the lower workpiece such that tightening the fasteners connecting the lower left and lower right collar segments will urge the lower collar assembly to grip the lower workpiece;
   (b) the upper collar assembly comprises a semi-cylindrical upper left collar segment and a semi-cylindrical upper right collar segment, wherein:
      (b.1) the upper left and upper right collar segments are removably connectable to each other by threaded fasteners to form the cylindrical upper collar assembly; and
      (b.2) the upper collar assembly is coaxially mountable around the upper workpiece such that tightening the fasteners connecting the upper left and upper right collar segments will urge the upper collar assembly to grip the upper workpiece;
   (c) each of the lower left and lower right collar segments defines an upward-facing semi-annular surface;
   (d) each of the upper left and upper right collar segments defines a downward-facing semi-annular surface;
   (e) the upward-facing surface of the lower left collar segment and the downward-facing surface of the upper left collar segment are complementarily profiled to form a first interlocking linear slide mechanism allowing relative horizontal sliding of the lower left and upper left collar segments while preventing relative rotation of the lower left and upper left collar segments about the clamp assembly axis, wherein the sliding direction of the first interlocking linear slide mechanism is parallel to a vertical reference plane coincident with the clamp assembly axis and bisecting the interlocked lower left and upper left collar segments; and
   (f) the clamp assembly defines:
      (f.1) a first transverse axis that lies in a horizontal reference plane generally defined by the upward-facing and downward facing semi-annular surfaces, respectively, of the interlocked lower left and upper left collar segments, is perpendicular to and intersects the clamp assembly axis, and is parallel to the sliding direction of the first interlocking linear slide mechanism; and
      (f.2) a second transverse axis that lies in a horizontal reference plane generally defined by the upward-facing and downward facing semi-annular surfaces, respectively, of the interlocked lower left and upper left collar segments, is perpendicular to and intersects the clamp assembly axis, and is perpendicular to the sliding direction of the first interlocking linear slide mechanism.

2. The clamp assembly as in claim 1 wherein the first interlocking linear slide mechanism is a dovetail slide mechanism.

3. The clamp assembly as in claim 1 wherein:
   (a) the lower left and lower right collar segments are identical and are rotationally symmetric about the clamp assembly axis; and
   (b) the upper left and upper right collar segments are identical and are rotationally symmetric about the clamp assembly axis.

4. The clamp assembly as in claim 1 wherein:
   (a) the lower left and upper right collar segments are identical and are rotationally symmetric about the first transverse axis; and
   (b) the lower right and upper left collar segments are identical and are rotationally symmetric about the first transverse axis.

5. The clamp assembly as in claim 1 wherein:
   (a) the lower left and upper right collar segments are identical and are rotationally symmetric about the second transverse axis; and
   (b) the lower right and the upper left collar segments are identical and are rotationally symmetric about the second transverse axis.

6. The clamp assembly as in claim 1 wherein all of the collar segments are identical and are rotationally symmetric about the clamp assembly axis, the first transverse axis, and the second transverse axis.

7. The clamp assembly as in claim 1 wherein the upward-facing surface of the lower right collar segment and the downward-facing surface of the upper right collar segment are complementarily profiled to form a second interlocking linear slide mechanism allowing relative horizontal sliding of the lower right and upper right collar segments while preventing relative rotation of the lower right and upper right collar segments about the clamp assembly axis.

8. The clamp assembly as in claim 1 wherein:
   (a) the threaded fasteners are loosely assembled with barrel nuts and barrel washers to facilitate mounting of the clamp assembly onto the upper and lower workpieces and to accommodate angular misalignment between the two collar segments of each collar assembly;
   (b) a first one of the collar segments of each collar assembly is configured with holes that hold captive the loosely-assembled threaded fasteners, barrel washers, and barrel nuts; and
   (c) a second one of the collar segments of each collar assembly is configured with hooks that permit the loosely-assembled threaded fasteners, barrel washers, and barrel nuts to quickly latch the second one of the collar segments, and to securely hold the barrel nut when the threaded fasteners are tightened.

9. The clamp assembly as in claim 1 wherein an inner surface of each collar segment is provided with one or more grip elements each having a gripping surface.

10. The clamp assembly as in claim 9 wherein at least one of the one or more grip elements is a removable grip element.

11. The clamp assembly as in claim 10 wherein the removable grip element comprises a tong die.

12. The clamp assembly as in claim 9 wherein at least one of the one or more grip elements is formed integrally with the associated collar segment.

\* \* \* \* \*